United States Patent
Li et al.

(10) Patent No.: US 9,685,652 B2
(45) Date of Patent: *Jun. 20, 2017

(54) AQUEOUS PROCESSING OF COMPOSITE LITHIUM ION ELECTRODE MATERIAL

(71) Applicant: UT-BATTELLE, LLC, Oak Ridge, TN (US)

(72) Inventors: Jianlin Li, Knoxville, TN (US); Beth L. Armstrong, Clinton, TN (US); Claus Daniel, Knoxville, TN (US); David L. Wood, III, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 131 days.

This patent is subject to a terminal disclaimer.

(21) Appl. No.: 14/590,572

(22) Filed: Jan. 6, 2015

(65) Prior Publication Data

US 2015/0188120 A1    Jul. 2, 2015

Related U.S. Application Data

(63) Continuation of application No. 13/651,270, filed on Oct. 12, 2012, now Pat. No. 8,956,688.

(60) Provisional application No. 61/546,413, filed on Oct. 12, 2011.

(51) Int. Cl.
| | |
|---|---|
| *B05D 5/12* | (2006.01) |
| *H01M 4/04* | (2006.01) |
| *H01M 4/13* | (2010.01) |
| *H01M 4/136* | (2010.01) |
| *H01M 4/139* | (2010.01) |

(Continued)

(52) U.S. Cl.
CPC .......... *H01M 4/0404* (2013.01); *B05D 3/068* (2013.01); *B05D 3/142* (2013.01); *H01M 4/13* (2013.01); *H01M 4/136* (2013.01); *H01M 4/139* (2013.01); *H01M 4/1391* (2013.01); *H01M 4/1397* (2013.01); *H01M 4/5825* (2013.01); *H01M 4/62* (2013.01); *H01M 4/625* (2013.01); *B82Y 30/00* (2013.01); *B82Y 99/00* (2013.01); *H01M 4/622* (2013.01); *Y02E 60/122* (2013.01); *Y10S 977/948* (2013.01)

(58) Field of Classification Search
USPC ............... 427/115; 429/90, 209, 231.95, 523
See application file for complete search history.

(56) References Cited

U.S. PATENT DOCUMENTS

| | | | |
|---|---|---|---|
| 4,554,061 A * | 11/1985 | Ritchie | C08J 3/12 204/492 |
| 6,787,600 B1 * | 9/2004 | Thetford | B01F 17/005 524/599 |

(Continued)

FOREIGN PATENT DOCUMENTS

JP    2009-224099    * 10/2009

*Primary Examiner* — Brian K Talbot
(74) *Attorney, Agent, or Firm* — Fox Rothschild LLP

(57) ABSTRACT

A method of making a battery electrode includes the steps of dispersing an active electrode material and a conductive additive in water with at least one dispersant to create a mixed dispersion; treating a surface of a current collector to raise the surface energy of the surface to at least the surface tension of the mixed dispersion; depositing the dispersed active electrode material and conductive additive on a current collector; and heating the coated surface to remove water from the coating.

26 Claims, 35 Drawing Sheets

(51) Int. Cl.
*H01M 4/1397* (2010.01)
*H01M 4/58* (2010.01)
*H01M 4/62* (2006.01)
*B05D 3/06* (2006.01)
*B05D 3/14* (2006.01)
*H01M 4/1391* (2010.01)
*B82Y 99/00* (2011.01)
*B82Y 30/00* (2011.01)

(56) References Cited

U.S. PATENT DOCUMENTS

| | | | | |
|---|---|---|---|---|
| 8,956,688 B2 * | 2/2015 | Li | | H01M 4/0404 427/115 |
| 2006/0237693 A1 * | 10/2006 | O'Hara | | H01M 4/8828 252/500 |
| 2007/0157852 A1 * | 7/2007 | Lee | | B01F 17/0021 106/278 |
| 2009/0220678 A1 * | 9/2009 | Kono | | H01M 4/136 427/58 |
| 2009/0226635 A1 * | 9/2009 | Leblanc | | H01M 4/0404 427/557 |
| 2009/0305132 A1 * | 12/2009 | Gauthier | | H01M 4/04 429/207 |
| 2009/0317725 A1 * | 12/2009 | Jiang | | H01M 4/06 429/326 |
| 2010/0015514 A1 * | 1/2010 | Miyagi | | H01M 10/052 429/129 |
| 2013/0202959 A1 * | 8/2013 | Chiang | | G02F 1/1523 429/209 |

* cited by examiner

AQUEOUS PROCESSING OF COMPOSITE LITHIUM ION ELECTRODE MATERIAL

CROSS REFERENCE TO RELATED APPLICATIONS

This is a continuation of U.S. application Ser. No. 13/651,270 now U.S. Pat. No. 8,956,688, filed Oct. 12, 2012, entitled "AQUEOUS PROCESSING OF COMPOSITE LITHIUM ION ELECTRODE MATERIAL, which claims priority to U.S. Provisional Patent Application No. 61/546,413 filed Oct. 12, 2011, the disclosures of which are incorporated herein by reference in their entireties.

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to lithium on electrodes, and more particularly to methods of producing lithium ion electrodes.

BACKGROUND OF THE INVENTION

Rechargeable lithium-ion batteries have received extensive attention in the last two decades and have been used in portable electronic devices such as laptop computers, cellular phones and personal digital assistants. However, application to electric vehicles and grid energy storage is limited by performance and cost. The main components of battery costs are materials, labor and overhead with the cost of materials and associated processing making up over 80% of total costs of high power batteries. Thus, the key to reducing costs of lithium-ion batteries lies in achieving low cost materials and developing low cost material processing, which is especially true for the cathode. Cathode materials and processing represent the majority of the total cost of high power batteries.

$LiFePO_4$ is a promising cathode material for the next generation of scalable lithium-ion batteries, which is ascribed to low price, good cycle life, safety and low environmental impact (i.e. no toxic elements in the compound). For conventional lithium-ion batteries, the manufacturing process of $LiFePO_4$ cathodes involves a slurry processing in which $LiFePO_4$ is mixed with other additives in a solvent. Polyvinylidene fluoride (PVDF) and N-methyl-2-pyrrolidone (NMP) are the typical binder and solvent, respectively. If the composite cathodes could be processed through an aqueous system, in which the expensive NMP is replaced with deionized water, the cost would be significantly reduced and the process for recovery and treatment of NMP would be eliminated. Additionally, replacing PVDF with xanthan gum or carboxymethyl cellulose would reduce fluorine content in the electrodes, and the formation of LIF could be suppressed. The overall process would become substantially more environmentally benign; consequently, there is growing interest in fabricating composite cathodes through aqueous processing. However, replacing NMP with water creates problems with dispersion stability. Particles in water based dispersions can agglomerate due to hydrogen bonding and strong electrostatic forces. These driving forces are even more problematic for $LiFePO_4$ since the material is optimized for improved electrochemical performance by making nanoparticles with a resulting larger surface area.

Agglomeration is caused by the interactions between colloidal particles. These interactions include attractive and repulsive potentials, which are generated from van der Waals and Coulomb forces, respectively. Usually, the attractive potential is dominant at greater distances between particles. The stability of the particles depends on the net potential generated between the van der Waals and Coulomb forces. Therefore, to minimize agglomeration, the key is to increase the repulsive potential (i.e. increase the Coulomb force) between particles. The repulsive potential depends on the particle surface charge, and it is measured indirectly. The measurement is known as the zeta potential and it is dependent on the surface chemistry of colloidal particles.

SUMMARY OF THE INVENTION

A method of making a battery electrode includes the steps of dispersing an active electrode material and a conductive additive in water with at least one dispersant to create a mixed dispersion; treating a surface of a current collector to raise the surface energy of the surface above the surface tension of at least one of water and the mixed dispersion; depositing the dispersed active electrode material and conductive additive on a current collector; and heating the coated surface to remove water from the coating.

The active electrode material can be a cathode material. The cathode material can be at least one selected from the group consisting of $LiCoO_2$, $LiNiO_2$, $LiMn_2O_4$, $LiFePO_4$, $LiMnPO_4$, $LiFe_xMn_{1-x}PO_4$, $LiNi_xMn_yCo_{1-x-y}O_2$, $Li_{1+x}Ni_yMn_zCo_{1-x-y-z}O_2$, $LiNi_xMn_yCo_zAl_{1-x-y-z}O_2$, $Li_{1+x}Ni_yMn_{1-x}Co_zO_2$, and $Cu_2ZnSn(S,Se)_4$.

The active electrode material can be an anode material. The anode material can be at least one selected from the group consisting of synthetic graphite particulate, natural graphite particulate, Si particle-C fiber nanocomposites, $LiTiO_2$, $Li_4Ti_5O_{12}$, Sn particulate, and Si particulate.

The conductive additive can be at least one selected from the group consisting of carbon black, graphite particulate, graphene, and carbon nanotubes.

The dispersed active electrode material and the dispersed conductive additive material can be separate suspensions. The dispersed suspensions can be combined prior to the depositing step. The at least one dispersant can be added to water, and the active electrode material and conductive additive can be dispersed in the water as a single suspension.

The method can include the step of dispersing at least one binder material with the at least one dispersant. The binder can be at least one selected from the group consisting of styrene butadiene rubber (SBR), carboxymethyl cellulose (CMC), xanthan gum, perfluorosulfonic acid (PFSA), and polyvinylidene fluoride (PVDF).

The electrode can comprise 60-99% active electrode material, 0-20 wt % conductive additive, and 1-20 wt % binder, based on the total weight of the electrode.

The heating step can comprise a multistage heating with different temperatures.

A dispersant is provided for dispersing the active electrode material and at least one other dispersant can be provided for dispersing the conductive additive.

The method can include the step of measuring the zeta potential of the active electrode material and the conductive additive material prior to the dispersing step. A cationic or anionic dispersant can be selected based on the zeta potential.

The method can include the step of determining the isoelectric point (IEP) of the active electrode material and the conductive additive material prior to the dispersing step. The method can further include if the isoelectric point (IEP) pH<6 selecting a cationic dispersant, if IEP 6≤pH≤8, then selecting a cationic or anionic surfactant, and if IEP pH>8 then selecting an anionic surfactant. The zeta potential of the solid particulate and its dispersant can be measured to verify zeta potential greater than +30 mV or less than −30 mV. The cationic dispersant can be polyethyleneimine (PEI), and the anionic dispersant can be polyacrylic acid (PAA).

The aqueous dispersion can be essentially free of organic solvent.

The heating of the coated suspension can be between 90° F. and 210° F. The heating can be stepped and conducted at different temperatures during a multistage heating cycle. The heating process can comprise nine steps starting at 90° F. at the $1^{st}$ step, reaching at 210° F. at the $8^{th}$ step and ending at 170° F. at the $9^{th}$ step, ±5 degrees for each step. The method can comprise a second heating step for drying the electrode. The second heating step can be subjecting the electrode to temperatures of between 90° F. and 400° F. The drying heating temperature can be selected based upon binder properties. The heating step can be performed under vacuum.

The active electrode material can comprise $LiFePO_4$, the conductive additive can comprise carbon black, and the dispersant can comprise polyethyleneimine (PEI), The concentration of PEI can be 0.5 wt % to 2.0 wt %.

The surface treatment step can include subjecting the surface of the current collector to at least one selected from the group consisting of a plasma treatment, laser treatment, wet chemical treatment, ion beam treatment, electron beam treatment, and thermal etching treatment. The plasma treatment can be a corona treatment.

The dispersing step can comprise dispersing an active material in water with at least one dispersant to create an active electrode material dispersion. A conductive additive is dispersed in water to create a conductive additive dispersion. The active electrode material dispersion is mixed with the conductive additive dispersion to create a mixed dispersion.

A method of making a battery electrode can include the steps of providing a suspension of an active electrode material in water; providing a suspension of a conductive additive in water; measuring the zeta potential of each diluted suspension and, if the suspension has an unstable zeta potential, adding a cationic or anionic dispersant until the solution acquires a predetermined rheological flow characteristic; depositing the dispersed active electrode material and conductive additive on a current collector; and heating the coated surface to remove water from the coating.

The method can include if the isoelectric point (IEP) pH<6 selecting a cationic dispersant, if IEP 6≤pH≤8, then selecting a cationic or anionic surfactant, and if IEP pH>8 then selecting an anionic surfactant. The cationic dispersant can be polyethyleneimine (PEI), and the anionic dispersant can be polyacrylic acid (PAA).

The predetermined rheological flow characteristic can be the slope of a log-log plot of the shear stress as a function of shear rate. The method can include if the slope is not between 0.9 and 1.1, then changing at least one of the dispersant or the concentration of the dispersant in the dispersion.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
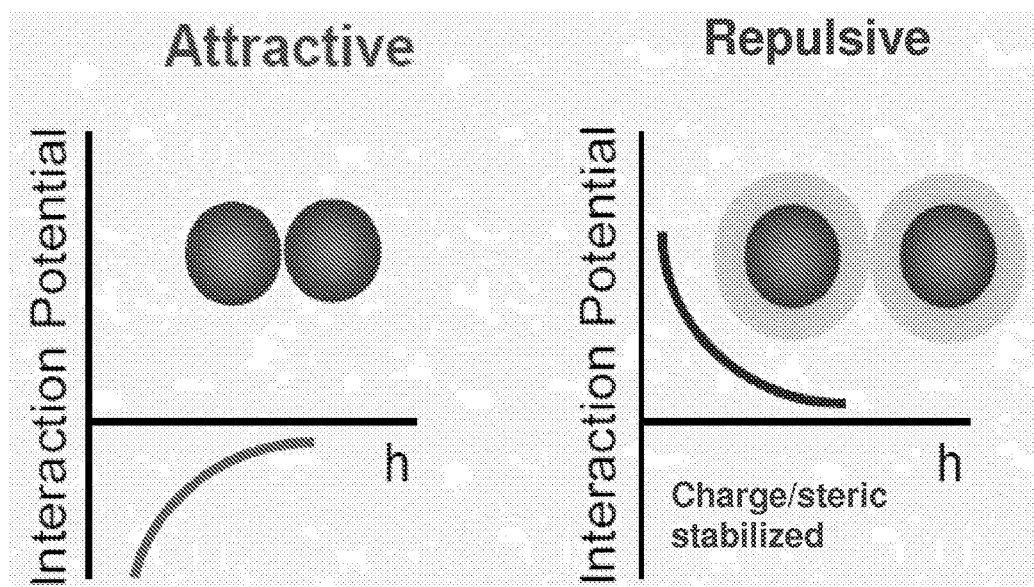
FIG. 1 is a schematic diagram of attractive and repulsive forces in agglomeration.
Figure 2:
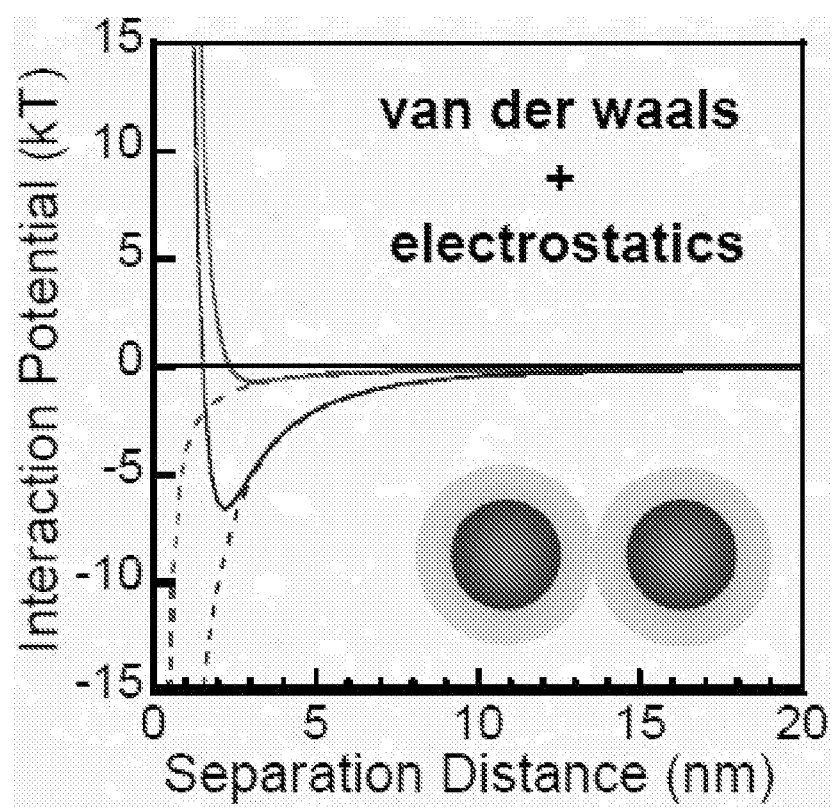
FIG. 2 is a plot of interaction potential (kT) versus separation distance (nm) between two colloidal particles.

FIG. 1 is a schematic diagram of attractive and repulsive potentials in agglomeration. Suspension stability depends on the overall potential of these two. Agglomeration is the result of net attractive potential in the dispersion. The key to improving suspension stability is to increase repulsive potential, which depends on the charge on particle surface. Therefore, adjusting the charge on the particle surface can control agglomeration of colloidal particles. FIG. 2 is a plot of interaction potential (kT) versus separation distance (nm) showing that the attractive potential is dominate in the bottom curve, whereas repulsive potential is pronounced in the top curve with a dispersant offsetting the attractive potential Thus, the addition of dispersant (top curve) enhances the repulsive potential of the particles and, consequently, reduces the agglomerate size.

Figure 3:
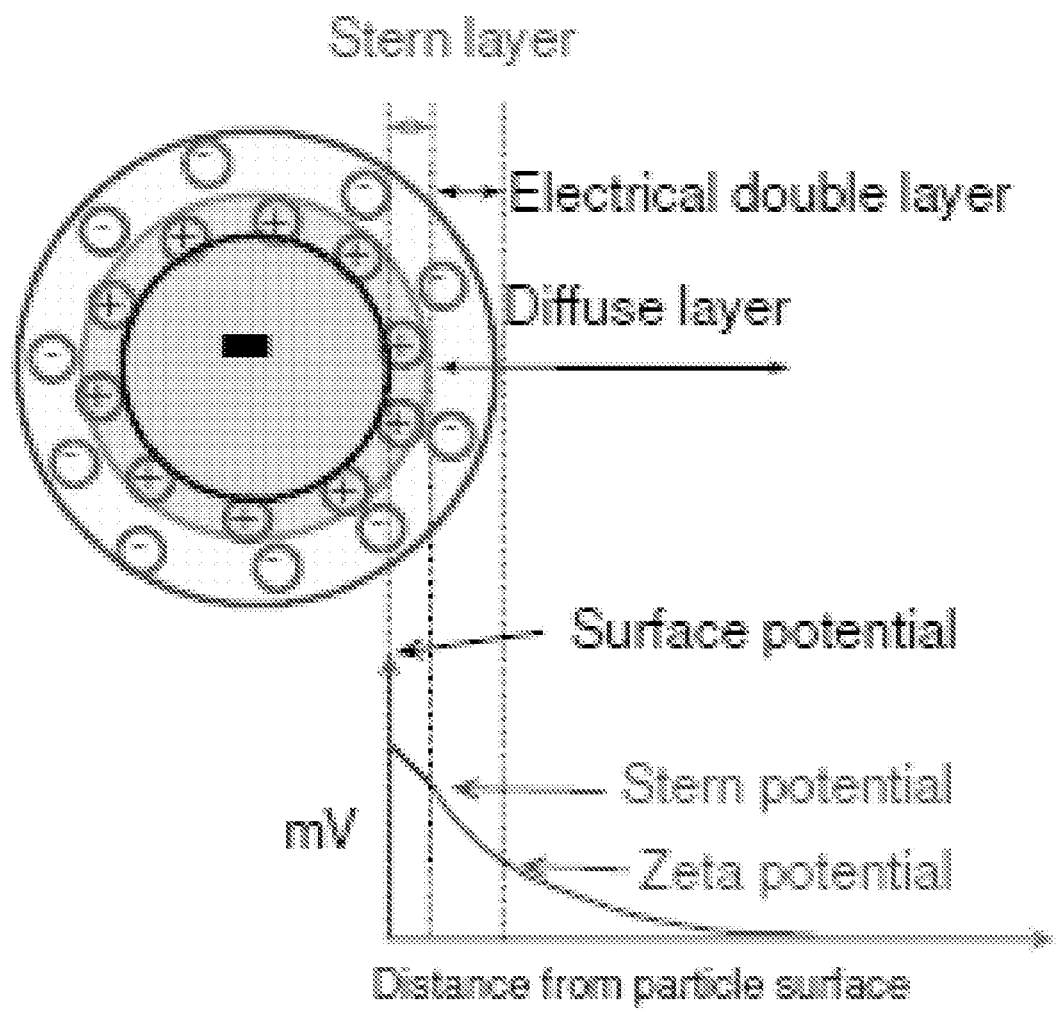
FIG. 3 is a schematic diagram illustrating surface potentials of a charged particle.

FIG. 3 is a schematic diagram illustrating surface potential of a charged particle. The zeta potential is the potential difference between the dispersion medium and the stationary layer of fluid attached to the dispersed particle.

Figure 4:
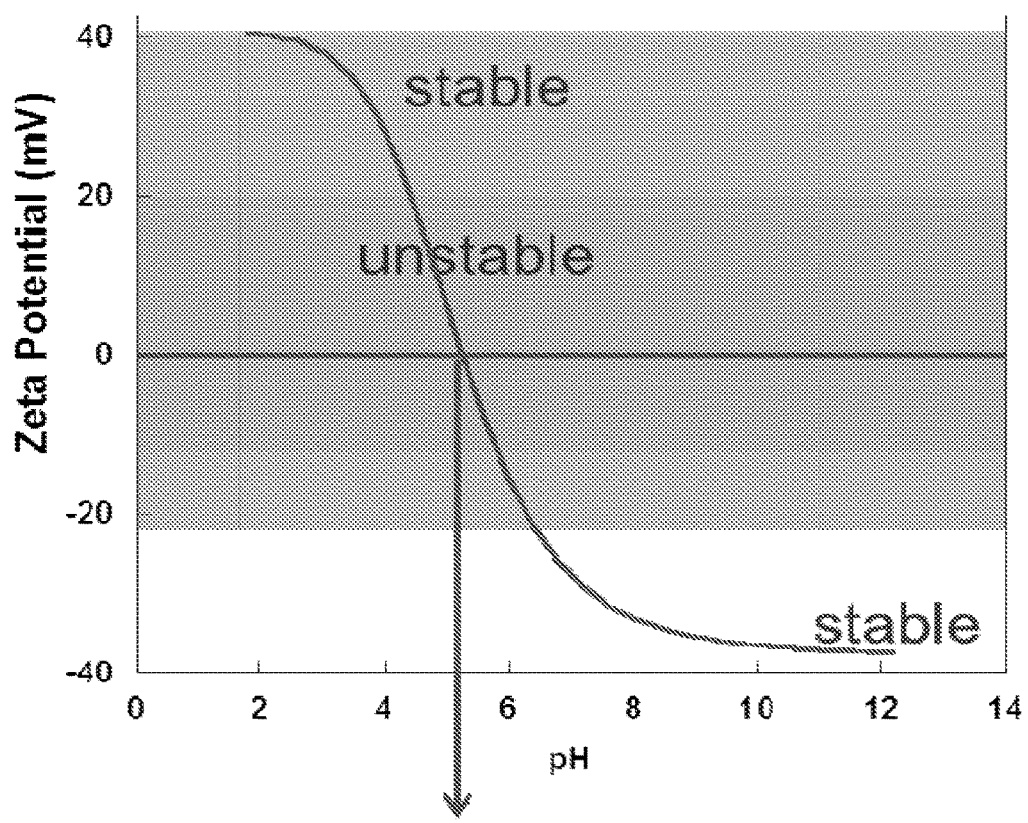
FIG. 4 is a typical plot of zeta potential (mV.

FIG. 4 is a plot of typical zeta potential (mV). Zeta potential can be related to the stability of colloidal dispersions. The dispersion is stable at either strongly positive (i.e. >30 mV) or strongly negative (i.e. <−30 mV) zeta potentials. The transition point from positive to negative zeta potential is known as the isoelectric point (IEP).

Figure 5:
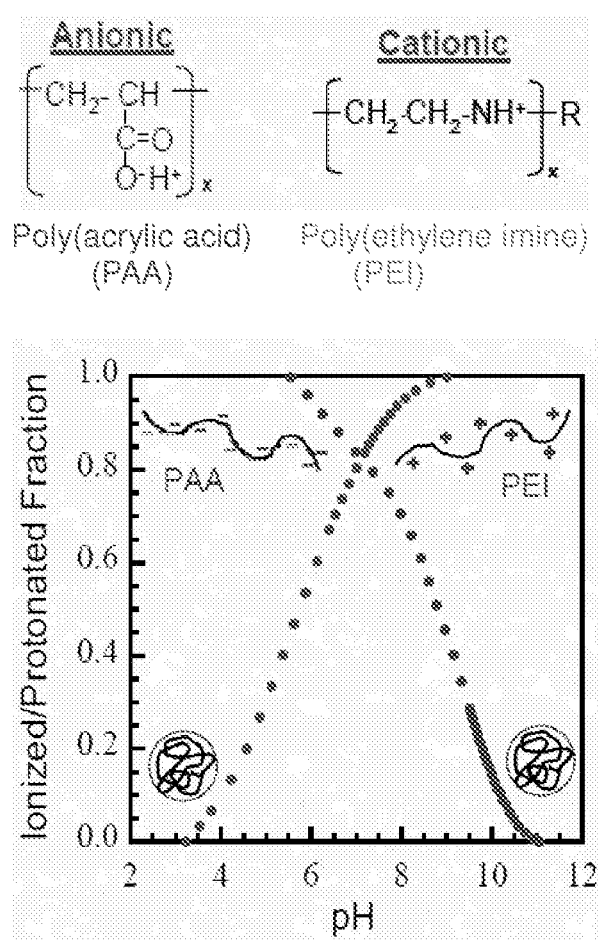
FIG. 5 is a plot of ionized/protonated fraction of PAA and PEI versus pH.

FIG. 5 is a plot of ionized/protonated fraction versus pH for poly(acrylic acid) (PAA) and poly(ethylene imine) (PEI).

A method of making a battery electrode according to the invention includes the steps of dispersing an active electrode material and a conductive additive in water with at least one dispersant to create a mixed dispersion; treating a surface of a current collector to raise the surface energy of the surface to at least the surface tension of the mixed dispersion; depositing the dispersed active electrode material and conductive additive on a current collector; and heating the coated surface to remove water from the coating. In one embodiment the surface of a current collector is treated to raise the surface energy of the surface to 1-1.5 times the surface tension of the mixed dispersion.

The active electrode material can be a cathode material. The cathode material can be at least one selected from the group consisting of LiCoO$_2$, LiNiO$_2$, LiMn$_2$O$_4$, LiFePO$_4$, LiMnPO$_4$, LiFe$_x$Mn$_{1-x}$PO$_4$, LiNi$_x$Mn$_y$Co$_{1-x-y}$O$_2$, Li$_{1+x}$Ni$_y$Mn$_z$Co$_{1-x-y-z}$O$_2$, LiNi$_x$Mn$_y$Co$_z$Al$_{1-x-y-z}$O$_2$, Li$_{1+x}$Ni$_y$Mn$_{1-x}$Co$_z$O$_2$, and Cu$_2$ZnSn(S,Se)$_4$. Other cathode materials are possible.

The active electrode material can be an anode material. The anode material can be at least one selected from the group consisting of synthetic graphite particulate, natural graphite particulate, Si particle-C fiber nanocomposites, LiTiO$_2$, Li$_4$Ti$_5$O$_{12}$, Sn particulate, and Si particulate. Other anode materials are possible.

The conductive additive can be at least one selected from the group consisting of carbon black, graphite particulate, graphene, and carbon nanotubes. Other conductive additives are possible.

The dispersed active electrode material and the dispersed conductive additive material can be separate suspensions. The dispersed suspensions can be combined prior to the depositing step. The at least one dispersant can be added to water, and the active electrode material and conductive additive can be dispersed in the water as a single suspension.

The method can include the step of dispersing at least one binder material with the at least one dispersant. The binder can be at least one selected from the group consisting of styrene butadiene rubber (SBR), carboxymethyl cellulose (CMC), xanthan gum (XG), perfluorosulfonic acid (PFSA), and polyvinylidene fluoride (PVDF). One such binder is Super P C45 (Timcal, hereafter "C45"), C45 is a commonly used carbon black in lithium-ion batteries and has a specific surface area of 45 m$^2$g$^{-1}$. Xanthan gum is a cheap, nontoxic binder that has been successfully used in lithium-ion batteries. Other binders are possible.

The electrode can comprise 60-99% active electrode material, 0-20 wt % conductive additive, and 1-20 wt % binder, based on the total weight of the electrode.

The heating step can comprise a multistage heating with different temperatures.

At least one dispersant is provided for dispersing the active electrode material and the conductive additive. A dispersant is an additive used to control particle dispersion, which reduces the amount of solvent trapped inside the agglomerate and allows for increasing solids loading in a powder suspension and for controlling particle packing during processing. Both cationic (such as PEI) and an ionic dispersants (such as PAA and poly(4-styene sulfonic acid, PSSA)) have been used in LiFePO$_4$ aqueous suspensions. Other cationic and anionic dispersants are possible. Non-ionic dispersants could also be possible, such as Triton X-100. $_{[DLWT]}$ The method can include the step of determining the zeta potential of the active electrode material and the conductive additive material prior to the dispersing step. Zeta potential is related to the electrophoretic mobility by the Henry equation. Any suitable method for measuring the electrophoretic mobility can be used. For example, the movement of individual particles can be tacked using ultra-microscope techniques and laser Doppler and phase analysis light scattering. An appropriate dispersant can be selected based on the zeta potential.

The method can include the step of determining the isoelectric point (IEP) of the active electrode material and the conductive additive material prior to the dispersing step. The method can further include if the isoelectric point (IEP) pH<6 selecting a cationic dispersant, if IEP 6≤pH≤8, then selecting a cationic or anionic dispersant, and if IEP pH>8 then selecting an anionic dispersant. The zeta potential of the solid particulate and its dispersant can be determined to verify zeta potential greater than +30 mV or less than −30 mV. The cationic dispersant can be polyethyleneimine (PEI), and the anionic dispersant can be polyacrylic acid (PAA).

The aqueous dispersion can be essentially free of non-aqueous solvent. The term essentially free of nonaqueous solvent means that the dispersion has less than about 30 vol % of the total dispersion volume. The solvent system can be pure water or mixture of water with other lower-toxicity solvents, such as ethanol.

The heating of the coated suspension can be between 90° F. and 210° F. The heating can be stepped and conducted at different temperatures during a multistage heating cycle. The heating process depends on 1) the solvent system, 2) solid loading of the suspensions, 3) the areal solid loading of electrode, 4) coating speed, 5) exhaust flow rate, 6) formation of a desired electrode architecture (pores-size distribution or porosity gradient, and the like), and 7) the level of drying required to achieve a certain water content of the electrode. A typical heating process for an aqueous suspension comprises nine steps starting at 90° F. at the $1^{st}$ step, reaching at 210° F. at the $8^{th}$ step and ending at 170° F. at the $9^{th}$ step, ±5 degrees for each step. The method can comprise a second heating step for drying the electrode for further water removal. The second heating step can be subjecting the electrode to temperatures of between 90° F. and 400° F. The drying heating temperature can be selected based upon binder properties. The heating step can be performed under vacuum and can last between an hour to 1-2 days.

The active electrode material can comprise $LiFePO_4$, the conductive additive can comprise carbon black, and the dispersant can comprise polyethyleneimine (PEI). The concentration of PEI can be 0.05 wt % to 10.0 wt %.

A surface treatment step can be provided to treat the current collector so that the wetting of the current collector with the aqueous dispersion is enhanced. The surface treatment step can include subjecting the surface of the current collector to at least one selected from the group consisting of a plasma treatment, laser treatment, wet chemical treatment, ion beam treatment, electron beam treatment, and thermal etching treatment. The plasma treatment can be a corona treatment.

The dispersing step can comprise dispersing an active material in water with at least one dispersant to create an active electrode material dispersion. A conductive additive is dispersed in water to create a conductive additive dispersion. The active electrode material dispersion is mixed with the conductive additive dispersion to create a mixed dispersion.

A method of making a battery electrode, can include the steps of providing a suspension of an active electrode material in water; providing a suspension of a conductive additive in water; determining the zeta potential of each diluted suspension and, if the suspension has an unstable zeta potential, adding a cationic or anionic dispersant until the solution acquires a predetermined rheological flow characteristic; depositing the dispersed active electrode material and conductive additive on a current collector; and heating the coated surface to remove water from the coating.

The method can include if the IEP pH<6 and the operating pH above the IEP selecting a cationic dispersant, if IEP 6≤pH≤8, then selecting a cationic or anionic surfactant, and if IEP pH>8 and the operating pH below the IEP then selecting an anionic surfactant. The cationic dispersant can be PEI, and the anionic dispersant can be PAA.

The desired rheological flow could demonstrate Newtonian or Bingham plastic behavior which can be characterized by the slope of a log-log plot of the shear stress as a function of shear rate. The slope should ideally be between 0.9 and 1.1. The method can include if the slope is not between 0.9 and 1.1, then changing at least one of the dispersant or the concentration of the dispersant in the dispersion.

Figure 6:
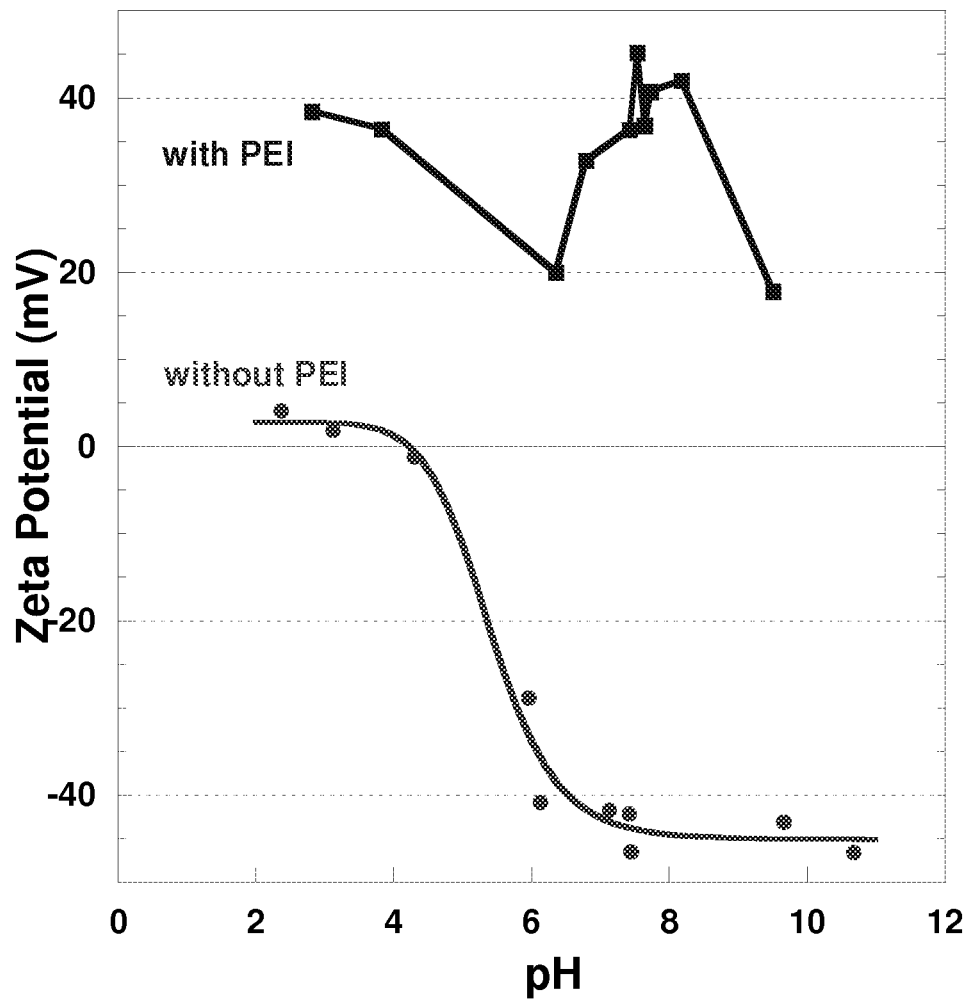
FIG. 6$a$)-$b$) are plots of zeta potential (mV) versus pH with and without PEI (1 wt %) for a) C—$LiFePO_4$ and b) C45.
Figure 6:
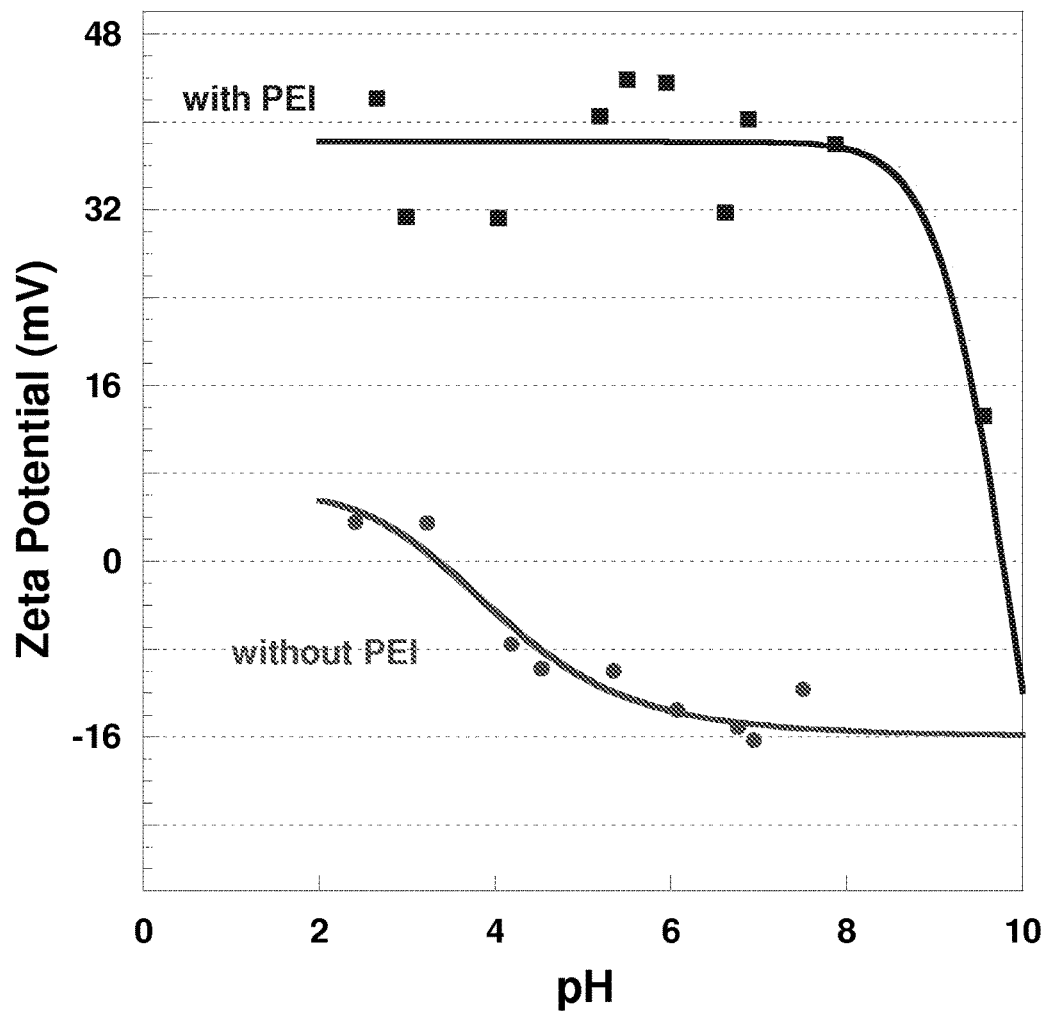

FIG. 6a)-b) are plots of zeta potential (mV) versus pH with and without PEI (1 wt %, MW=25,000 g $mol^{-1}$) for a) C—$LiFePO_4$ and b) C45. From FIG. 6a it is seen that the isoelectric point (IEP) of $LiFePO_4$ was pH=4.3, the point where the charge on the particle surfaces is zero. It is here that the suspension is in its least stable state with respect to particle agglomeration. The IEP also provides guidance on selection of the type of dispersant (surfactant) required to obtain a stable dispersion. According to FIG. 6a, the charge on the surface of the $LiFePO_4$ particles is negative at pH>4.3. The appropriate pH for $LiFePO_4$ suspensions should be close to neutral to avoid corrosion on aluminum current collectors in the subsequent coating processes. A cationic dispersant, such as PEI, with positive charge will adsorb more easily on $LiFePO_4$ particles than an anionic dispersant with negative charge. The zeta potentials of $LiFePO_4$ with PEI dispersant is also shown in FIG. 6a, and it is seen that the values changed to positive across the entire pH range indicating PEI successfully adsorbed on the surface of $LiFePO_4$ particles. Typical zeta potential measurements require solutions to be aged at least 24 h to achieve an equilibrium charge state. The scatter seen in the zeta potentials measured are attributed to non-equilibrium conditions existing at the time of measurement.

In $LiFePO_4$ aqueous cathode suspensions for lithium ion battery electrodes, there are two other components required, the conductive carbon additive, such as C45 and the binder, such as XG (water soluble). To have maximum efficacy as a dispersant for the $LiFePO_4$ aqueous cathode suspension, PEI also needs to be efficient in dispersing the C45. Therefore, the zeta potential of C45 was also investigated with and without PEI and the results are shown in FIG. 6b.

According to FIG. 6b, there is pronounced agglomeration in the C45 suspension with low zeta potential. Although $LiFePO_4$ showed highly negative zeta potential without PEI in FIG. 6a and could be well dispersed in water, the suspension could be unstable when mixing the $LiFePO_4$ and C45 together. The IEP of C45 was found to be pH=3.4, and the charge on the surface of the C45 particles was negative at pH>3.4. This data suggests that PEI is an appropriate dispersant for C45 similar to the findings for $LiFePO_4$. This is confirmed, however, by the zeta potential of C45 when PEI dispersant is added (see FIG. 6b). The charge on the C45 particle surfaces changed from predominantly negative without PEI to highly positive with PEI. Therefore, it can be concluded that PEI is an appropriate dispersant for both solid components in $LiFePO_4$ aqueous cathode suspensions.

Suspension Rheological Properties

In order to understand the effect of PEI on aqueous processing of $LiFePO_4$ cathode suspensions, rheological properties of the suspensions with individual and multiple components were investigated with different PEI concentrations. All PEI concentrations investigated in this work are referenced to the $LiFePO_4$ wt fraction. FIG. 7a-b are plots of rheological properties of $LiFePO_4$ suspensions with various amounts of PEI a) viscosity (Poise) versus shear rate ($s^{-1}$) and b) shear stress (Pa) versus shear rate ($s^{-1}$).

FIGS. 7a and 7b show the apparent viscosity and shear stress, respectively, as a function of shear rate for $LiFePO_4$ suspensions. The viscosity significantly decreased with addition of PEI; the suspensions also showed shear thinning behavior without PEI and Newtonian or slightly shear thickening behavior with the addition of PEI. These properties were further verified by the shear stress results shown in FIG. 7b, which were fitted with the Herschel-Bulkley (H-B) model for situations where a nonlinear dependence exists of shear stress on shear rate:

$$\begin{cases} \tau = \tau_0 + K\dot{\gamma}^n & \text{if } \tau > \tau_0 \\ \dot{\gamma} = 0 & \text{if } \tau \leq \tau_0 \end{cases} \quad (1)$$

where $\tau$, $\tau_0$, $K$, $\dot{\gamma}$ and $n$ are the shear stress, yield stress (stress needed to initiate the flow), consistency index, shear rate and power-law index, respectively. If $n=1$, this function reduces to the classical Bingham plastic equation, and if $\tau_0=0$ and $n=1$, this function describes Newtonian behavior. The $LiFePO_4$ suspension without PEI showed shear thinning behavior with $n=0.86$ and $\tau_0=18.3$ Pa, which indicates relatively strong interaction between agglomerates. However, when 0.5 wt % PEI was added, the $LiFePO_4$ suspension changed from shear thinning to Bingham plastic with $n=1.00$ and $\tau_0=13.1$ Pa for a shear rate below 1310 $s^{-1}$ and slightly shear thickening with $n=1.14$ and $\tau_0=-12.4$ Pa for shear rate above 1310 $s^{-1}$. As the PEI concentration was further increased, the $LiFePO_4$ suspensions showed Newtonian behavior with $n\approx1$ and $\tau_0\approx0$ Pa at $\dot{\gamma}<500$ $s^{-1}$, and slightly shear thickening at $\dot{\gamma}>500$ $s^{-1}$. The decrease in yield stress with increasing PEI concentration indicates that the interaction between the agglomerates was dominated by van der Waals forces for low or zero PEI concentrations, which were offset and eventually dominated by Coulomb forces at higher PEI concentrations (induced by the adsorption of PEI on the $LiFePO_4$ particles). Thus, the suspensions were stabilized and formed an ordered, layered structure. At higher shear rates (above the critical shear rate), the suspensions showed slightly shear thickening behavior, which is ascribed to the order-disorder transition of the ordered structure where the suspensions became unstable and more viscous. Based on this analysis of the critical shear rate, it is demonstrated that 1.0 wt % PEI is enough to stabilize $LiFePO_4$ in water.

Figure 7:
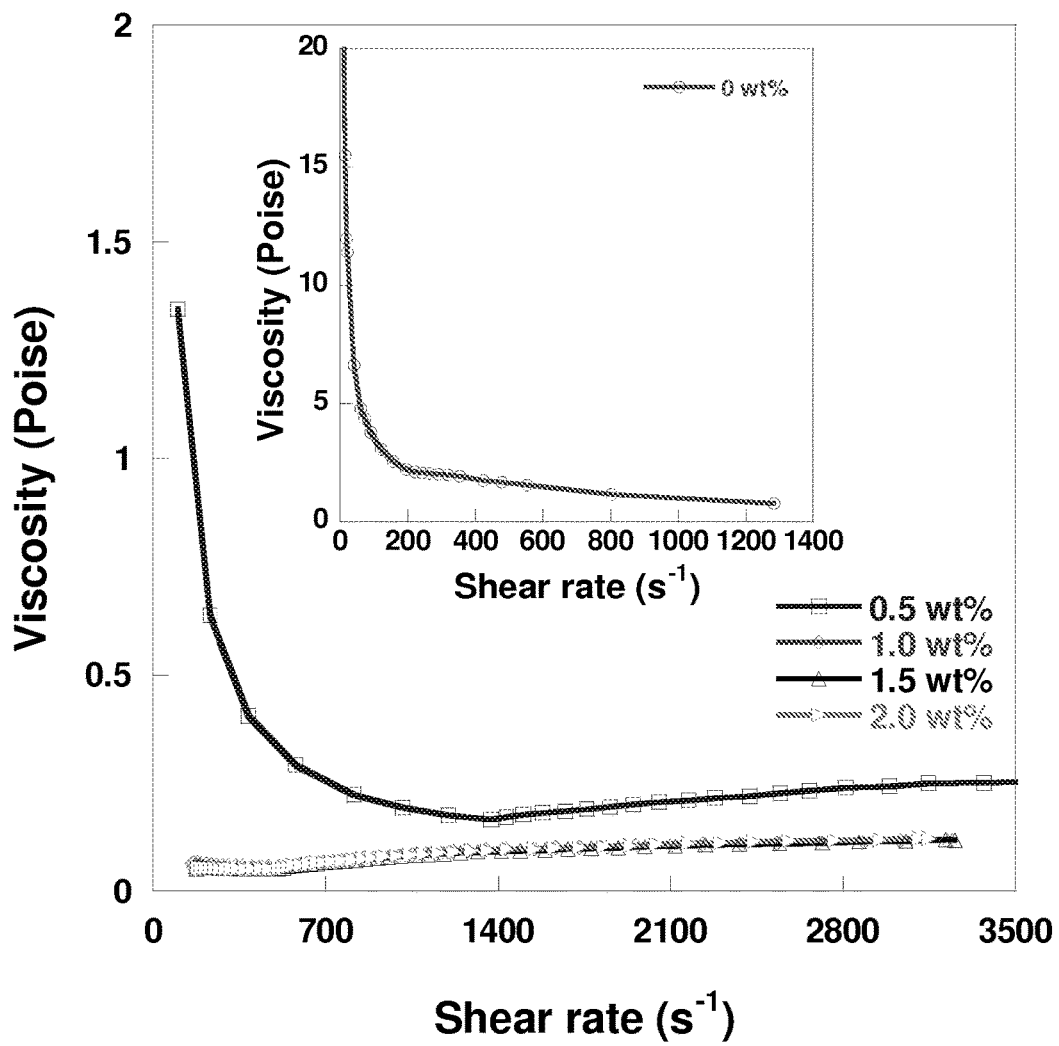
FIG. 7$a$)-$b$) are plots of rheological properties of $LiFePO_4$ suspensions with various amounts of PEI (molecular weight, MW=25,000 g $mol^{-1}$) a) viscosity (Poise) versus shear rate ($s^{-1}$) and b) shear stress (Pa) versus shear rate ($s^{-1}$).
Figure 7:
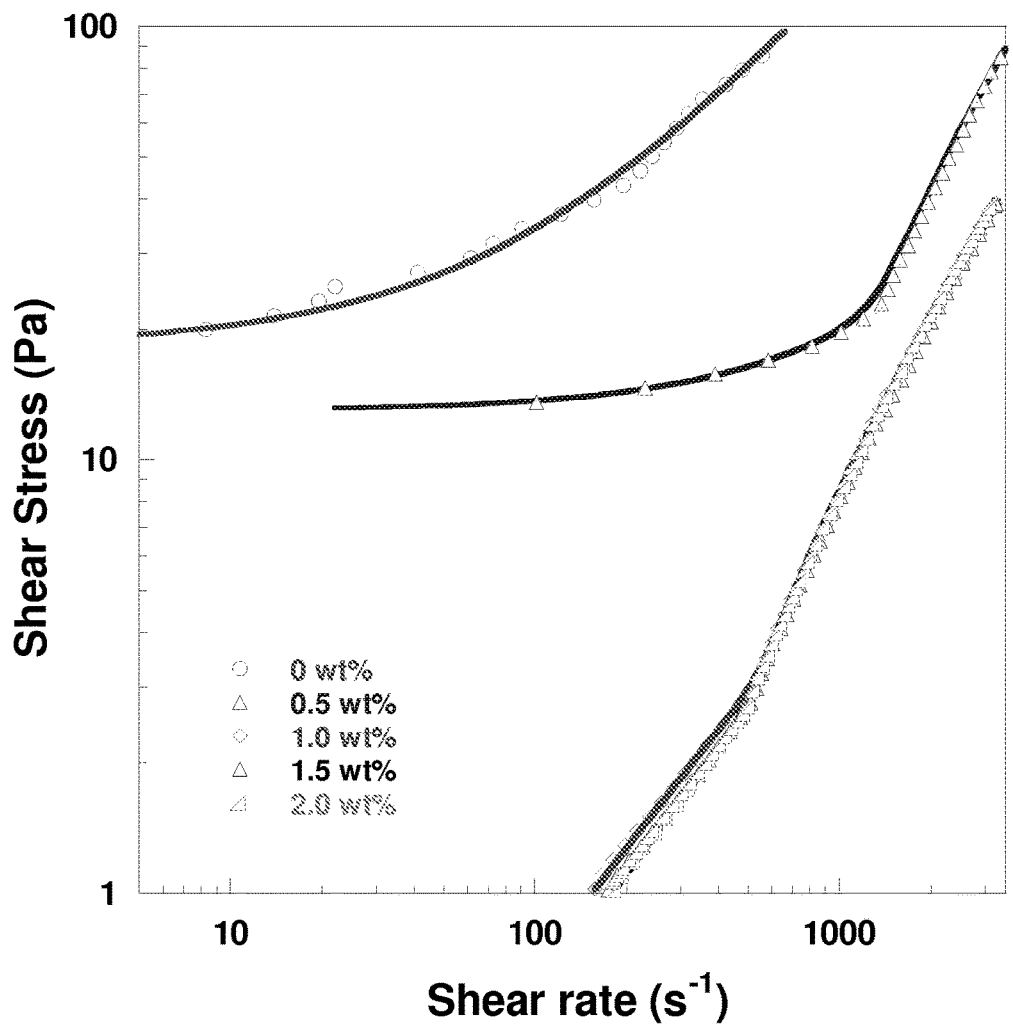
Figure 8:
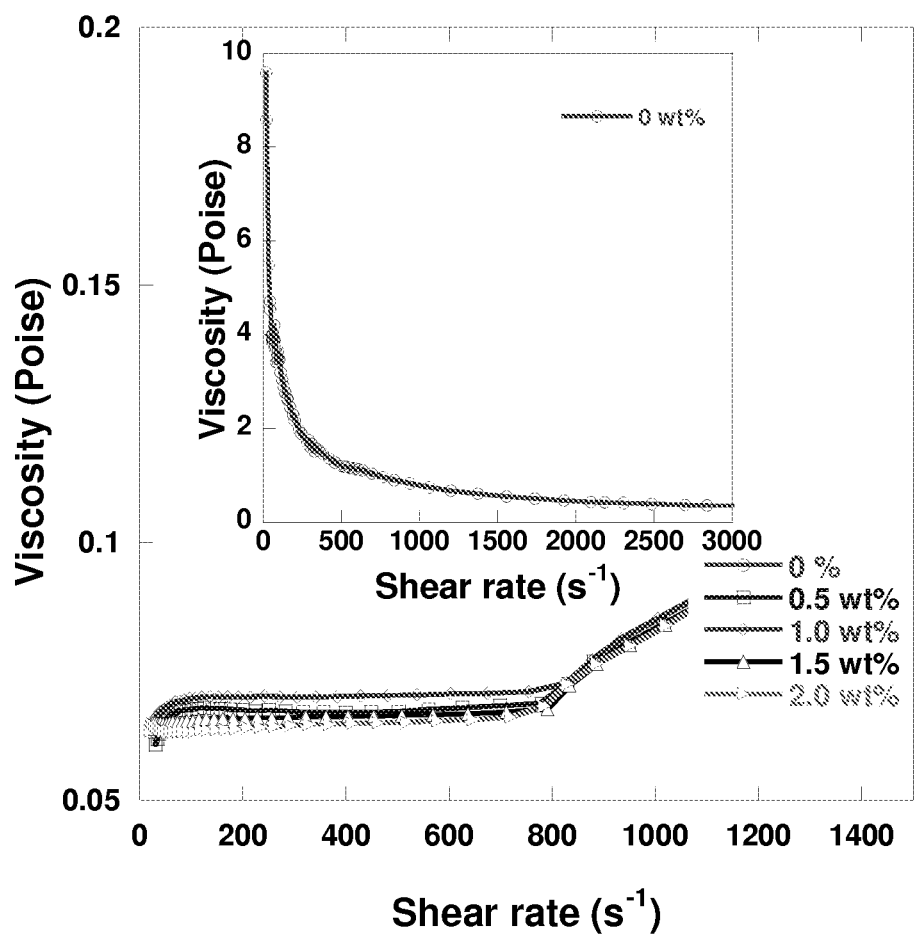
FIG. 8$a$)-$b$) are plots of rheological properties of C45 suspensions with various amounts of PEI (MW=25,000 g $mol^{-1}$) a) viscosity (Poise) versus shear rate ($s^{-1}$) and b) shear stress (Pa) versus shear rate ($s^{-1}$).
Figure 8:
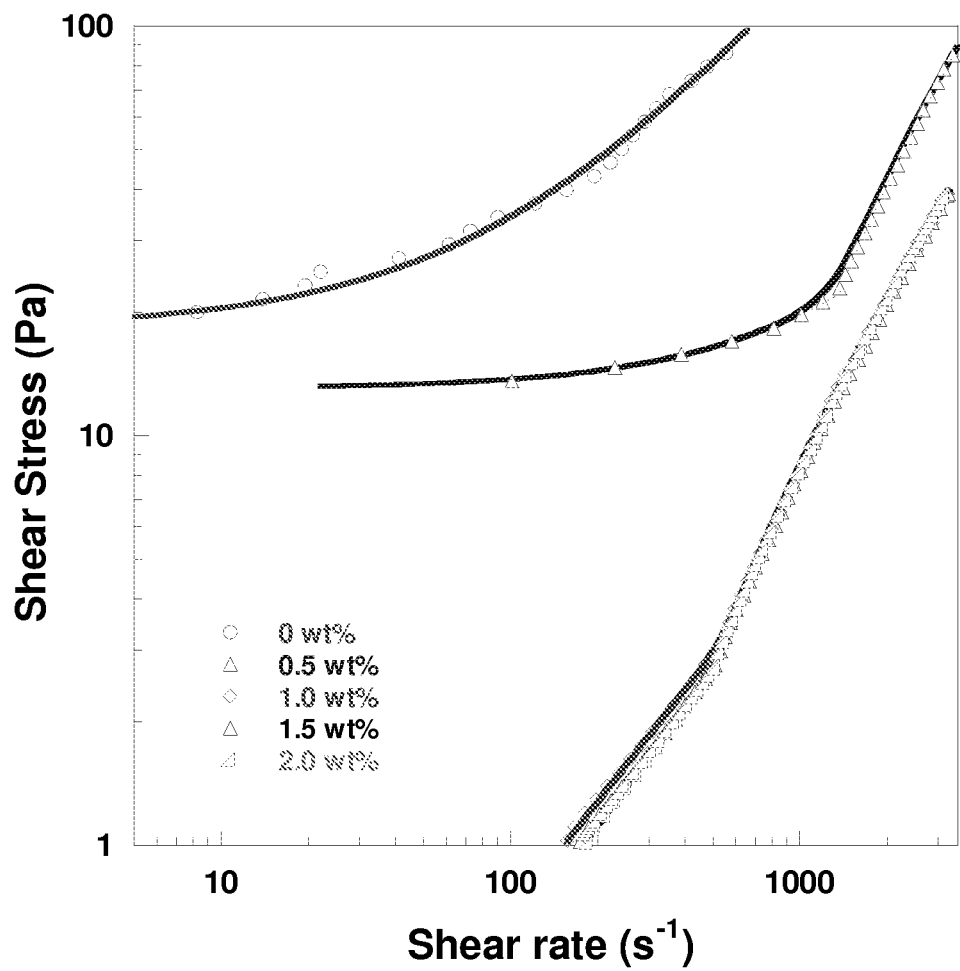

FIG. 8a)-b) are plots of similar rheological properties as those shown in FIGS. 7a)-b) of C45 suspensions with various amounts of PEI. FIG. 8 shows the rheological results of the C45 suspensions. All of the suspensions showed shear thickening behavior (n>1) at high shear rate, but at low shear rate the suspensions with PEI showed Newtonian behavior (n=1) whereas the one without PEI showed shear thinning, behavior (n<1). The suspensions with PEI were well dispersed and stable with the yield stress equal or close to 0 Pa. As was the case for the $LiFePO_4$, the observed shift from Newtonian to shear thickening behavior at high shear rate is due to the order-disorder transition of the ordered structure of C45 particles, and it was demonstrated that 0.5 wt % PEI is enough to effectively disperse C45 in water.

FIG. 9a)-b) are similar plots of rheological properties as those shown in FIGS. 7-8 of $LiFePO_4$-C45 suspensions with various amounts of PEI. Rheological properties of suspensions composed of $LiFePO_4$-C45 were measured and fitted with the H-B model. The suspensions with 1.0 wt % and 2.0 wt % PEI exhibited quasi-Newtonian behavior with the power-law index close to unity (i. e. $n\approx0.90$ or slightly shear thinning behavior) whereas the suspension with 1.5 wt % PEI showed s hear thickening behavior. From the simple perspective of weight fraction of materials, it could be assumed that 1.5 wt % PEI is enough to disperse the $LiFePO_4$-C45 suspensions since the individual $LiFePO_4$ suspension required 1.0 wt % PEI and the individual C45 suspension required 0.5 wt % PEI to achieve Newtonian behavior. However, rheological properties are complicated and affected by multiple complementary factors: 1) weight fraction of materials, 2) mixing method, 3) mixing sequence, 4) mixing time, etc. In fact, the observed decrease in yield stress confirmed that the interaction between agglomerates decreased with increasing PEI concentration up to 2.0 wt %.

Figure 9:
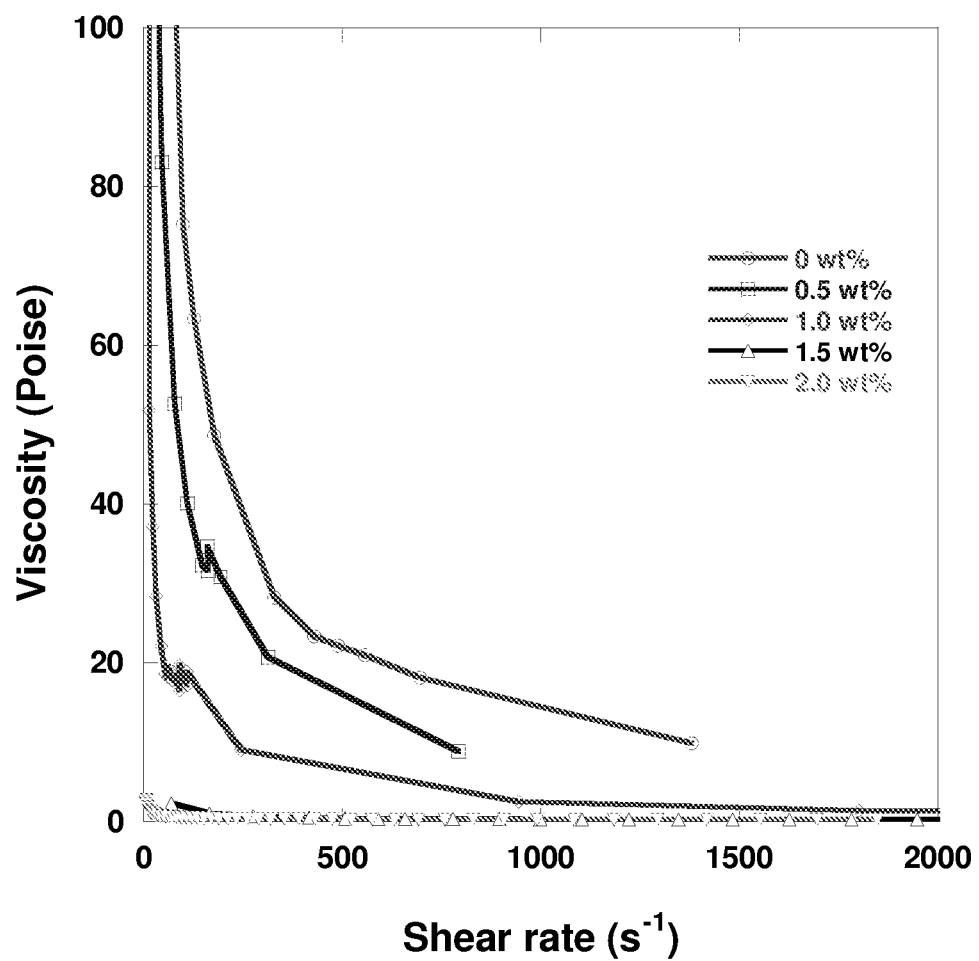
FIG. 9$a$)-$b$) are plots of rheological properties of $LiFePO_4$-C45 suspensions with various amounts of PEI (MW=25,000 g $mol^{-1}$) a) viscosity (Poise) versus shear rate ($s^{-1}$) and b) shear stress (Pa) versus shear rate ($s^{-1}$).
Figure 9:
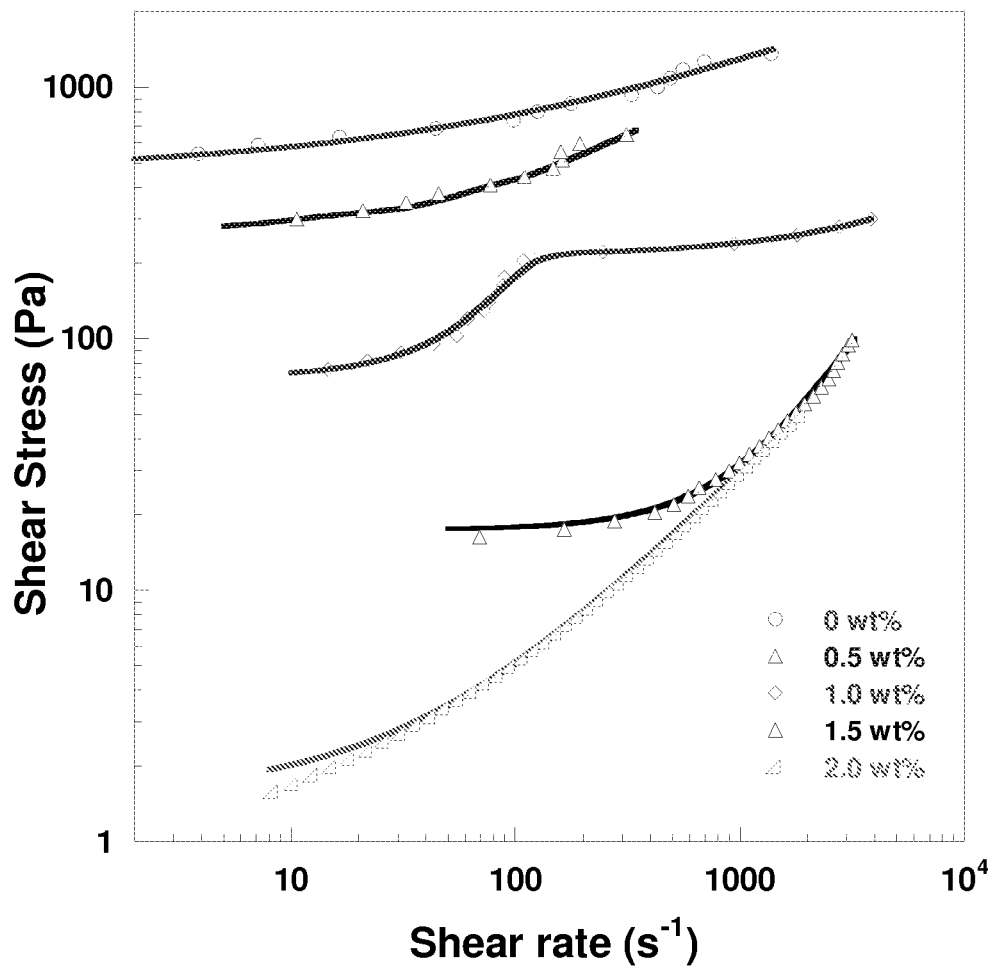
Figure 10:
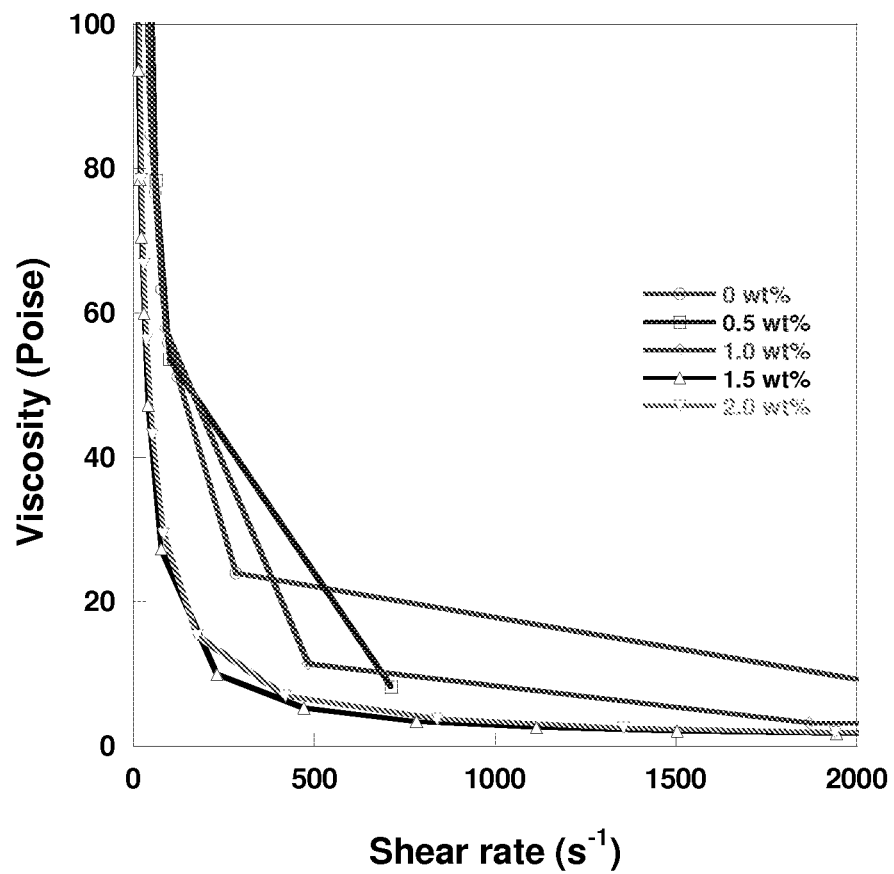
FIG. 10$a$)-$b$) are plots of rheological properties of LiFePO-C45-XG suspensions with various amounts of PEI (MW=25,000 g $mol^{-1}$) a) viscosity (Poise) versus shear rate ($s^{-1}$) and b) shear stress (Pa) versus shear rate ($s^{-1}$).
Figure 10:
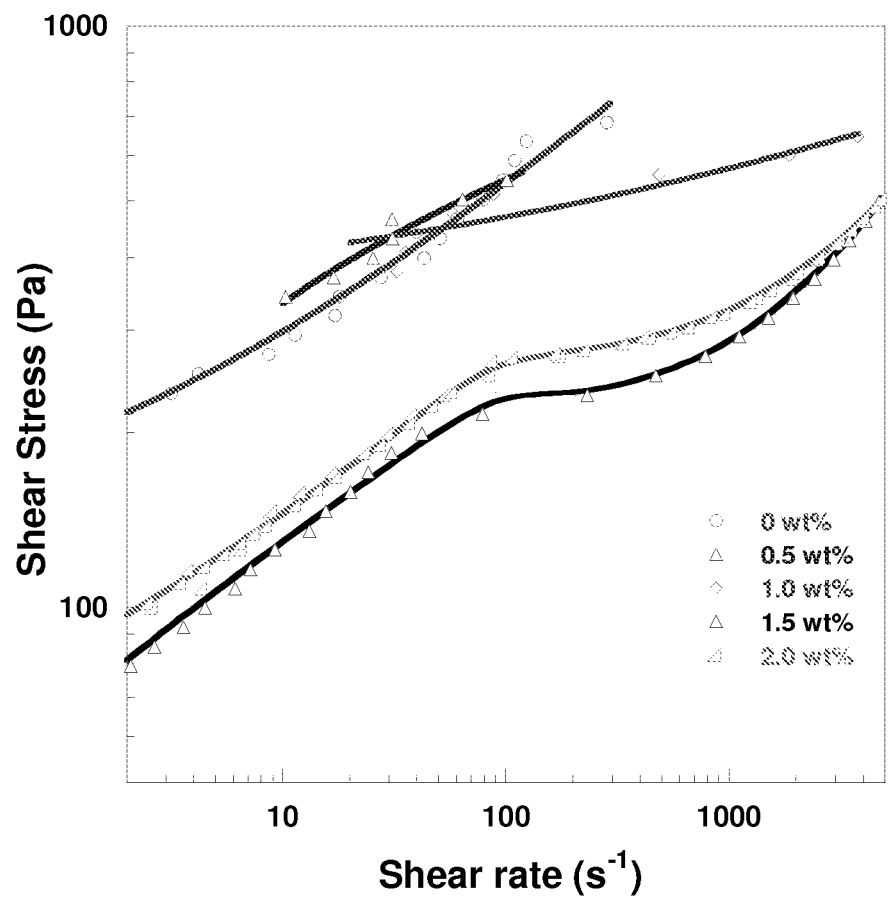

FIG. 10a)-b) are similar plots of rheological properties as those shown in FIGS. 7-9 of $LiFePO_4$-C45-Xanthan Gum (XG) suspensions with various amounts of PEI. All of these suspensions showed shear thinning behavior, and the addition of XG further reduced the respective power-law indices compared to the $LiFePO_4$-C45 suspensions. The addition of XG also increased the yield stress significantly (ascribed to the interlinking of particles by XG molecules), but the suspensions with 1.5 wt % and 2.0 wt % PEI and highest quality exhibited the lowest yield stresses and closest power-law indices to unity.

Figure 11:
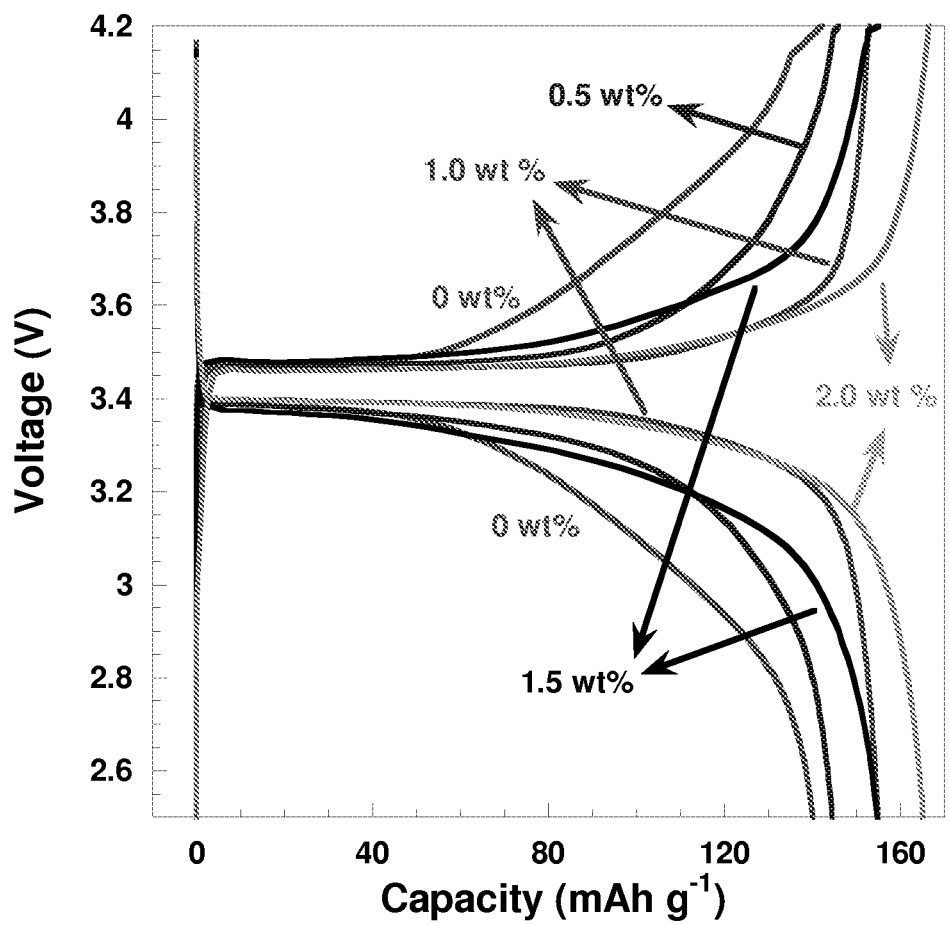
FIG. 11 is a plot of voltage profile (V) versus capacity (mAh$g^{-1}$) of $LiFePO_4$ cathodes at differing concentrations of PEI (MW=25,000 g $mol^{-1}$).

FIG. 11 is a plot of voltage (V) profile versus capacity (mAh $g^{-1}$) at different PEI concentrations at the $5^{th}$ re-intercalation cycle and it is seen that the capacity of the $LiFePO_4$ cathodes increases in the first couple cycles. This increase is attributed to the reintercalation of the deintercalated lithium via air and water exposure. The addition of PEI significantly improved the $LiFePO_4$ cathode performance, and the one made with 2.0 wt % PEI exhibited the best capacity (~165 mAh $g^{-1}$). Furthermore, the polarization was much smaller with PEI addition, as evidenced by the broader plateaus. This could be attributed to smaller agglomerate size and more homogeneous distribution of cathode components, which favors lithium diffusion inside the $LiFePO_4$ agglomerates and the interfacial charge transfer.

Example $LiFePO_4$ (2-3 wt % C, P2, Phostech Lithium Inc.), Super P C45 (Timcal) (C45 hereafter), xanthan gum (Nuts Online) and PEI (MW=25,000 g mol-1, Sigma-Aldrich) were used. The C45 (BET surface area ~45 $m^2$ $g^{-1}$) was used as the carbon black.

The aqueous $LiFePO_4$ dispersions were prepared. The components in all the dispersions were maintained at the following by weight ratio where $LiFePO_4$/C45/PEI/xanthan gum/$H_2O$=100/10/0-2.0/2.5/350.

The dispersions were coated utilizing a custom slot-die coater (Frontier Industrial Technology) on pretreated Al foil and dried in a heating zone consisting of two IR lamps and seven convection ovens. The Al foil was pretreated by corona discharge (Compak 2000, Enrocon) at 1 kW and 10 ft $min^{-1}$ in order to improve its surface energy. The dried cathodes were further dried in a vacuum oven at 90° C. for an additional 2 h before being assembled into half cells. The morphology of the dried $LiFePO_4$ green tapes (without secondary vacuum drying) with and without PEI was characterized by a scanning electron microscopy (SEM) (JEOL 6500 FEG-SEM) and an optical microscope (VHX-1000, Keyence).

2032 coin cells were assembled inside a glove box with $LiFePO_4$ and Li metal as the cathodes and counter electrodes, respectively. Celgard 2325 was used as the separator. The cathodes had a loading of 2.5 mg $cm^{-2}$ $LiFePO_4$, and the electrolyte was 1.2 M $LiPF_6$ in ethylene carbonate:diethyl carbonate (3/7 wt. ratio, Novolyte). Cyclic voltammetry (CV) experiments were carried out with VSP potentiostats (BioLogic) at 25° C. within a scan range of 2.5-4.3 V vs. Li/$Li_+$ and scan rate of 0.1, 0.2 and 0.5 mV $s^{-1}$, respectively. The cells were cycled for performance analysis at 0.2 C/−0.2 C (85 μA $cm^{-2}$) between 2.5 and 4.2 V vs. Li/$Li_+$ (VSP, BioLogic) at 25° C. The rate performance was investigated with 0.2 C charge rate and varying discharge rate.

Figure 12:
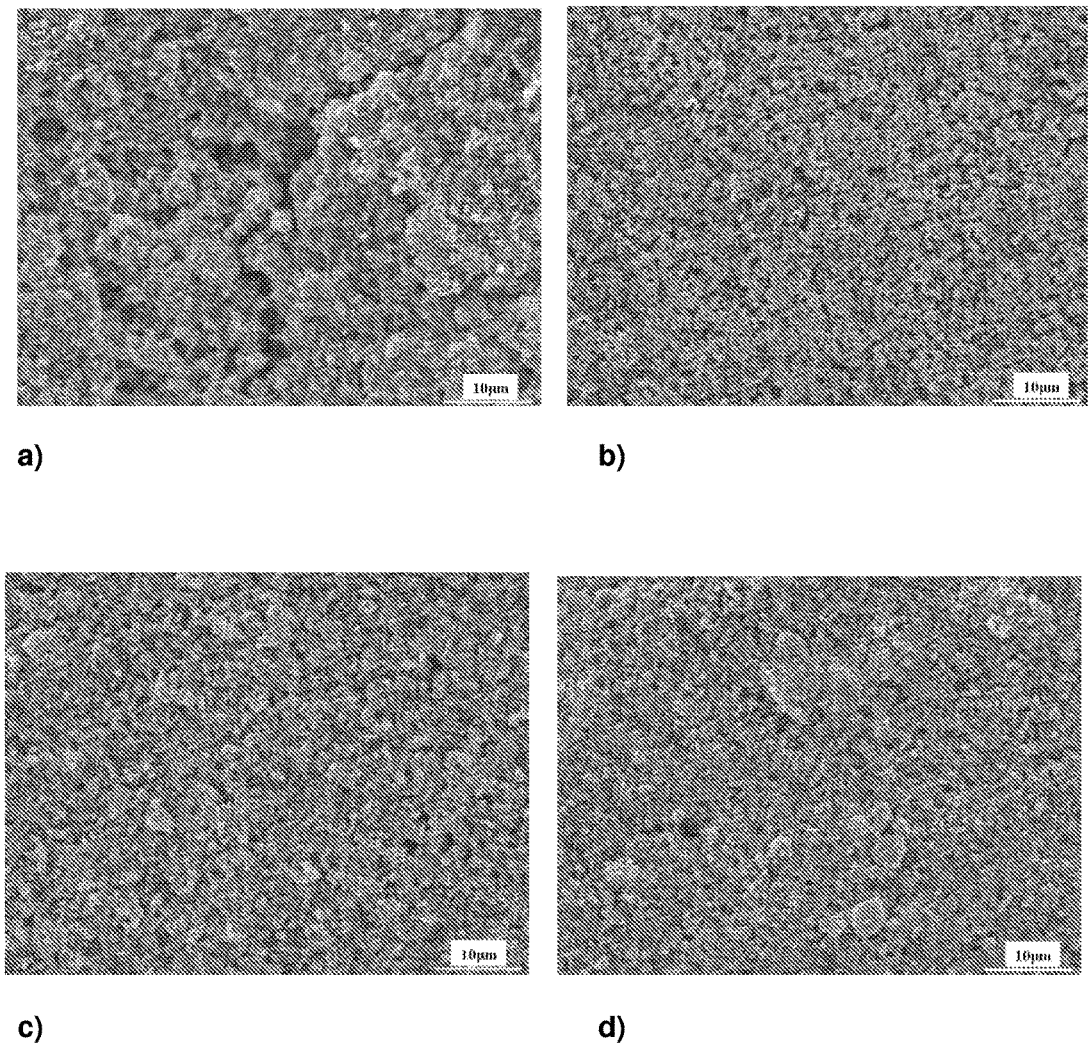
FIG. 12$a$)-$d$) are scanning electron microscopy (SEM) images of $LiFePO_4$ composite cathodes with various PEI concentrations a) without PEI; b) 0.5 wt % PEI; c) 1.0 wt % PEI and d) 2.0 wt % PEI.

FIG. 12 shows the surface morphology of the $LiFePO_4$ cathodes. FIG. 12a-d are scanning electron microscopy (SEM) images of LiFePO$_4$ composite cathodes with various PEI concentrations a) without PEI; b) 0.5 wt % PEI; c) 1.0 wt % PEI and d) 2.0 wt % PEI. There were significant agglomerates, cracks and large pores in the cathode without PEI (FIG. 12a). In contrast, the cathodes with PEI exhibited improved morphology with smaller agglomerate size and more uniformly distributed agglomerates.

Figure 13:
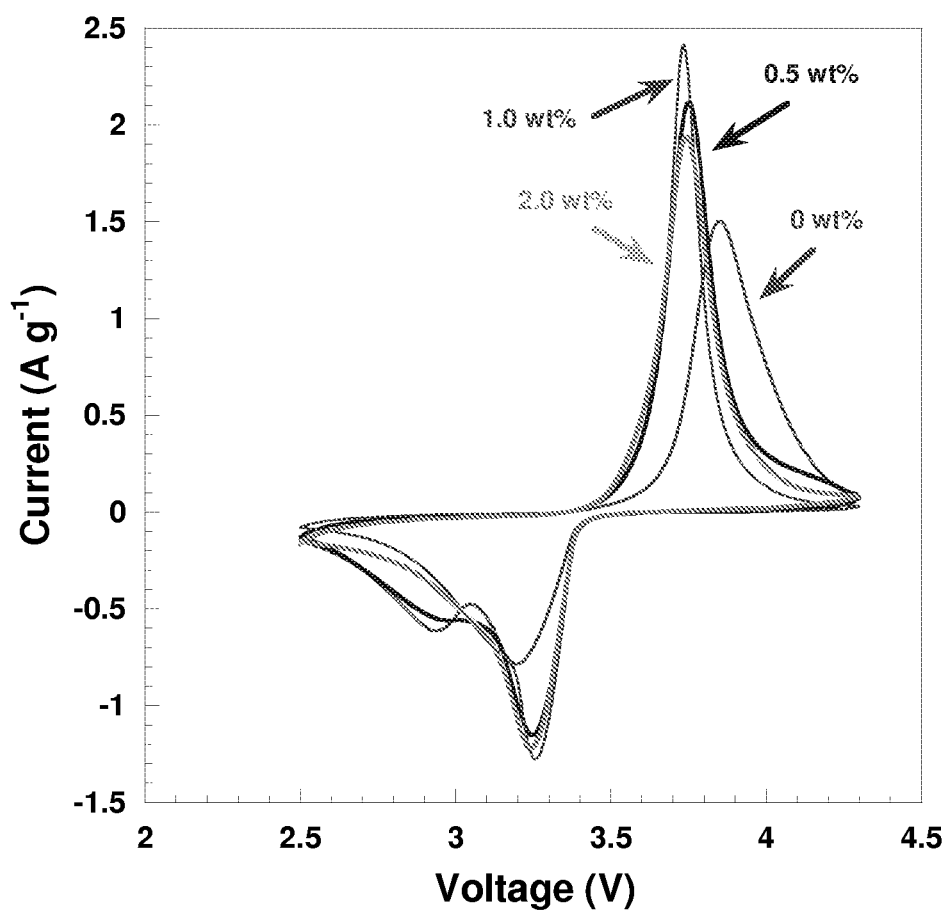
FIG. 13 is a plot of cyclic voltammetry curves for $LiFePO_4$ cathodes with various PEI concentrations.

FIG. 13 shows cyclic voltammograms (CVs) for LiFePO$_4$ cathodes with various PEI concentrations acquired at a scan rate of 0.1 mV s$^{-1}$. The addition of PEI increased current and reduced concentration polarization. There were two anodic peaks in the cathode without PEI, which could be attributed to bimodal distribution in agglomerate size or non-uniform contact between LiFePO$_4$ and carbon black. Larger agglomerate size and/or poor contact between LiFePO$_4$ and carbon black could have caused lower electronic conductivity, which could have shifted the anodic peak to lower potential.

Figure 14:
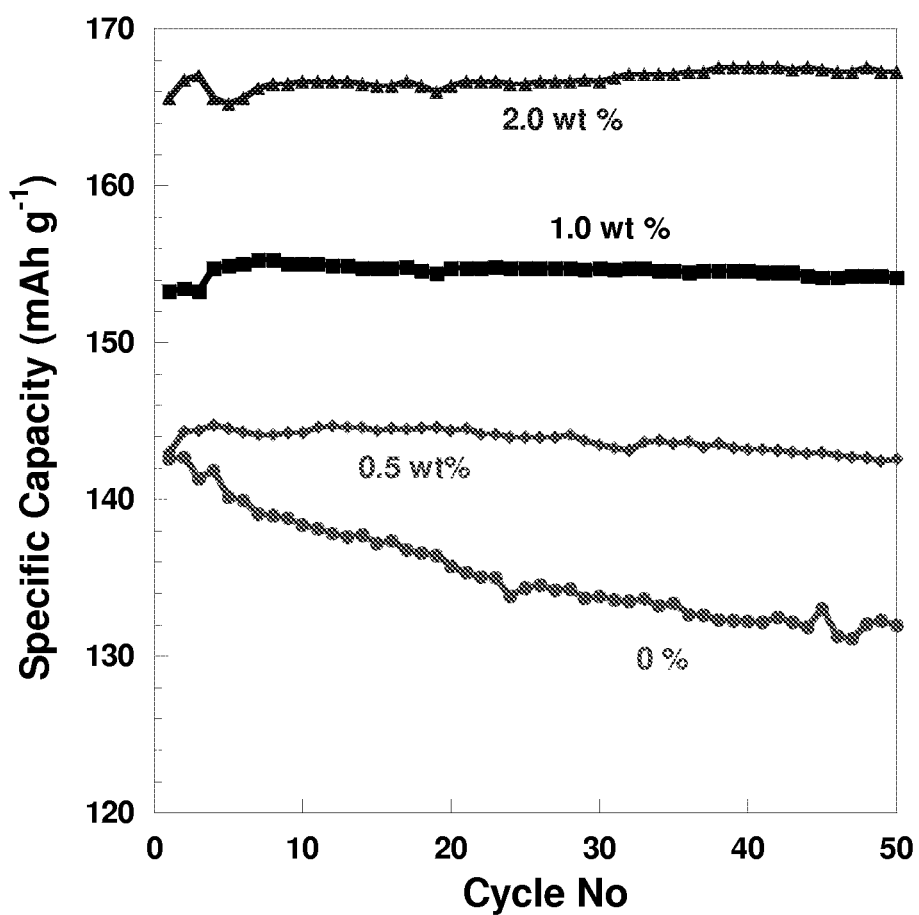
FIG. 14 is a plot of specific capacity (mAh $g^{-1}$) versus cycles for $LiFePO_4$ cathodes at 0.2 C/−0.2 C with various PEI concentrations.

FIG. 14 is a plot of specific capacity (mAh g$^{-1}$) versus number of cycles for LiFePO$_4$ cathodes at charged and discharged at 0.2 C/−0.2 C with various PEI concentrations. Compared to the LiFePO$_4$ cathode without PEI, the ones with PEI addition exhibited higher capacities, and the initial specific capacities increased with increasing PEI concentrations (from 142 to 167 mAh g$^{-1}$ with PEI concentration increasing from 0 wt % to 2.0 wt %).

Example

As received LiFePO$_4$ (2-3 wt % C coating, P2, d50=0.5−1.0 μm, Phostech Lithium Inc.), Super P C45 (Timcal) (C45 hereafter), xanthan gum binder (XG hereafter, Nuts Online) and branched PEI (MW=600, 2,000, 10,000, 25,000 and 750,000 g mol$^{-1}$, Sigma-Aldrich) were used.

Solutions of PEI with five MWs and five concentrations (0.25 wt % to 5.0 wt %) were mixed separately with LiFePO$_4$, then were repeated for C45. The suspensions were prepared by dissolving PEI in deionized (DI) water and mixing for 10 min, followed by dispersing LiFePO$_4$ and C45 into the resulting solutions and mixing by a high-shear rotary mixer (model 50, Netzsch) for 20 minutes, respectively. Viscosity of the suspensions was measured at 25° C. by a controlled stress rheometer (AR-G2, TA Instruments). Agglomerate size distribution of the suspensions was measured in water at 25° C. by laser diffraction (Partica LA-950V2, Horiba Scientific). Based on the results of the rheological properties and agglomerate size, optimal PEI in terms of MW and concentration was determined for both LiFePO$_4$ and C45 suspensions.

Four mixing sequences were investigated to prepare LiFePO$_4$ cathode suspensions. The ratio of components in all suspensions was maintained at LiFePO$_4$/C45/XG/H$_2$O=100/10/2.5/350 wt fraction. The total mixing time in each sequence was 30 min. In sequence 1 (S1), 1 wt % XG solution was mixed with the selected PEI concentrations and MWs for either LiFePO$_4$ and C45 and the desired amount of DI water for 10 min. LiFePO$_4$ powder was dispersed into the solution above for 10 min followed by dispersing C45 to the resulting suspension for 10 min. Sequence 2 (S2) was similar to S1 except reversing the dispersing sequences of LiFePO$_4$ and C45. For sequence 3 (S3), LiFePO$_4$ and C45 were mixed separately with the desired PEI amount and half of the XG solution for 10 min, respectively. The two suspensions were then combined and mixed for another 10 min. In sequence 4 (S4), both LiFePO$_4$ and C45 were added to the PEI and XG solution simultaneously instead of sequentially (as in S1 and S2), and mixed for 20 min.

LiFePO$_4$ cathodes for half-cell testing were prepared by casting the LiFePO$_4$ suspensions on pretreated Al foil manually using a doctor blade with 100 μm wet thickness. The Al foil was corona treated (Compak 2000, Enercon) at 1.7 J cm$^{-2}$ to increase its surface energy to the surface tension of water (72.8 mJ m$^{-2}$ at 25° C.) and, thus, achieve better wetting of LiFePO$_4$ suspension. The wet electrodes were dried at 90° C. in a vacuum oven for 3 h. The areal loading of LiFePO$_4$ cathodes was 2.1 mg cm$^{-2}$.

Half cells were assembled inside an argon filled glove box with LiFePO$_4$ and Li metal foil as the cathode and anode, respectively. Celgard 2325 was used as the separator, and 1.2 M LiPF$_6$ in ethylene carbonate:diethyl carbonate (3/7 wt ratio, Novolyte) was used as the electrolyte. The cells were cycled at 0.2 C/−0.2 C between 2.5 and 4.2 V with VSP potentiostats (BioLogic) at 25° C.

Figure 15:
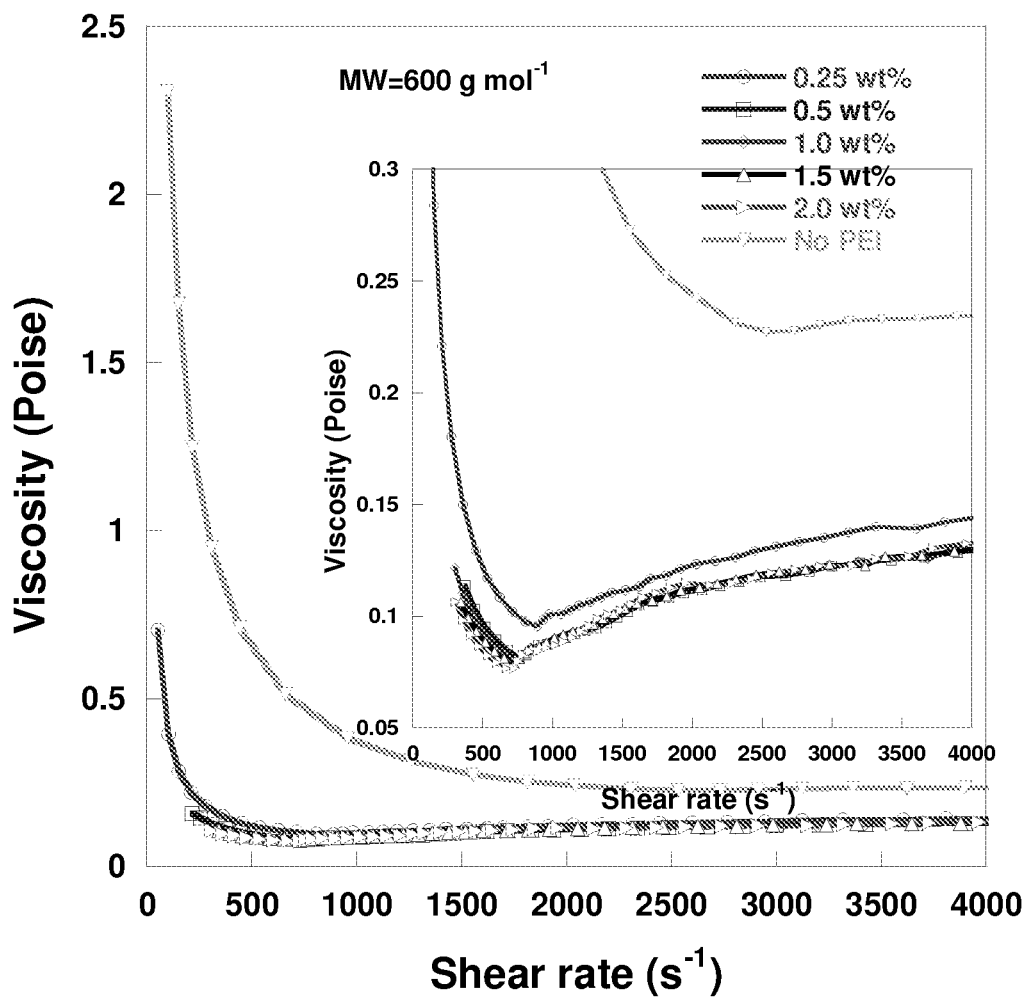
FIG. 15$a$)-$b$) are plots of rheological properties of $LiFePO_4$—$H_2O$ suspensions with PEI MW=600 g $mol^{-1}$ and various amounts of PEI a) viscosity (Poise) versus shear rate ($s^{-1}$) and b) shear stress (Pa) versus shear rate ($s^{-1}$).
Figure 15:
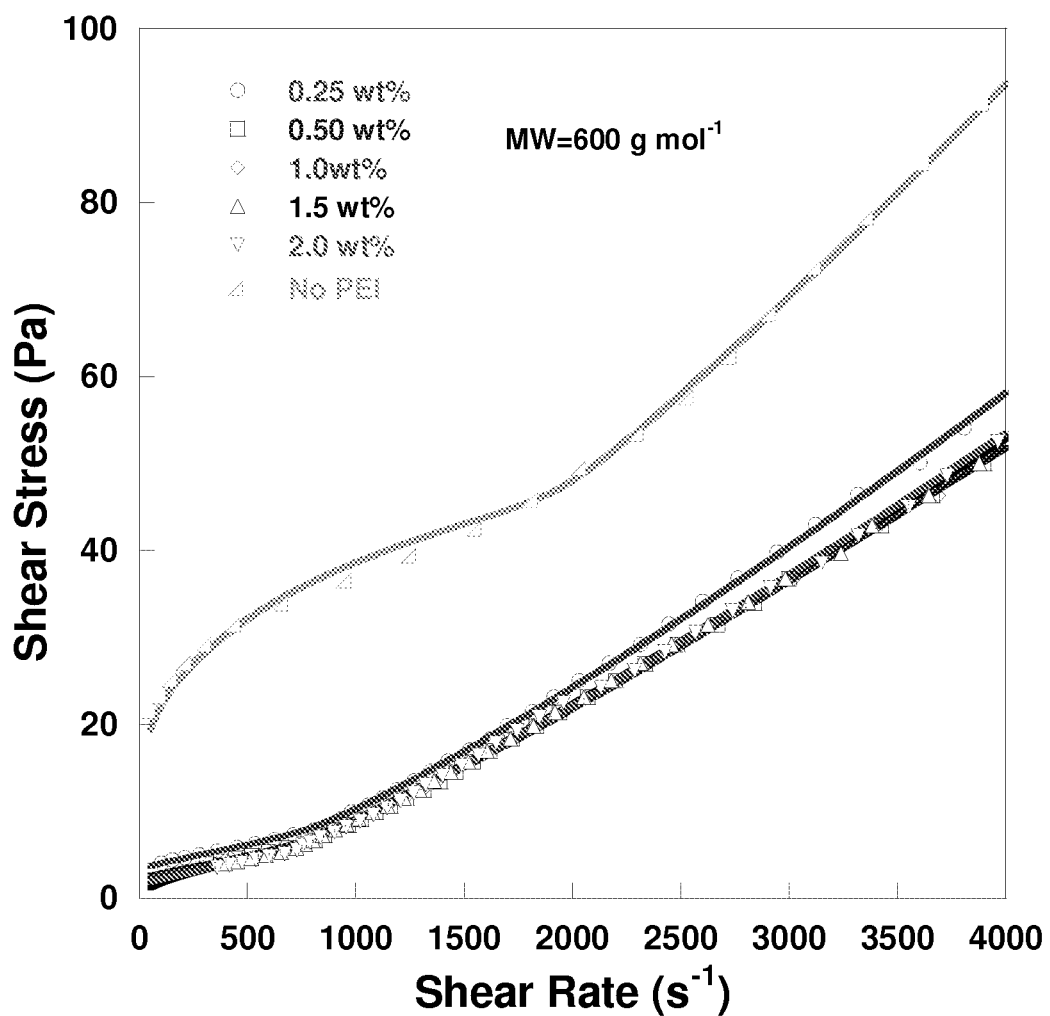

FIG. 15a)-b) are similar plots of rheological properties as FIGS. 7-10 of LiFePO$_4$—H$_2$O suspensions with PEI MW=600 g mol$^{-1}$ and various amounts of PEI. FIG. 15 shows the rheological properties of LiFePO$_4$—H$_2$O suspensions with PEI MW=600 g mol$^{-1}$ using five concentrations where PEI concentration was based on the weight fraction of LiFePO$_4$. There was a pronounced drop in viscosity with increasing shear rate for the suspensions with ≤0.25 wt % PEI, and the viscosity also slightly decreased with increasing PEI wt %, which indicates better dispersion of LiFePO$_4$ (i.e. less agglomeration with increasing PEI concentration). The desired Newtonian behavior (greatly reduced dependence of viscosity on shear rate) was observed for those suspensions with a PEI concentration>0.25 wt %.

Table I summarizes the H-B fitting parameters corresponding to the data shown in FIG. 15:

TABLE 1

Parameters from the H-B model for the LiFePO$_4$—H$_2$O suspensions with PEI MW = 600 g mol$^{-1}$

| PEI concentrations | $\tau_0$ (Pa) | n | Shear rate (s$^{-1}$) |
|---|---|---|---|
| 0 wt % | 7.5 | 0.32 | <2000 |
| 0.25 wt % | 3.3 | 0.87 | <750 |
| 0.50 wt % | 2.2 | 0.92 | |
| 1.00 wt % | 2.0 | 0.94 | |
| 1.50 wt % | 1.7 | 0.96 | |
| 2.00 wt % | 1.6 | 0.99 | |
| 0 wt % | 18.4 | 1.37 | >2000 |
| 0.25 wt % | 01. | 1.27 | >750 |
| 0.50 wt % | −1.6 | 1.18 | |
| 1.00 wt % | −0.1 | 1.28 | |
| 1.50 wt % | −1.0 | 1.21 | |
| 2.00 wt % | −0.6 | 1.25 | |

All LiFePO$_4$—H$_2$O suspensions demonstrated shear thinning or approaching Bingham plastic behavior at low shear rate and shear thickening behavior at high shear rate. Within the low shear rate region, yield stress ($\tau_0$) decreased with increasing PEI wt % indicating a reduction in interaction between agglomerates and improved suspension stability. Additionally, power-law index (n) increased with increasing PEI wt % and approached 1 when the PEI concentration was >1.0 wt %, indicating the suspensions shift from shear thinning behavior to a Bingham plastic regime. A critical shear rate was also observed for all suspensions at which an order-disorder transition of the ordered structure took place and the suspensions became unstable and more viscous. The critical shear rate (>750 s$^{-1}$) was relatively high, but was still within the operating window of common industrial coating methods.

Figure 16:
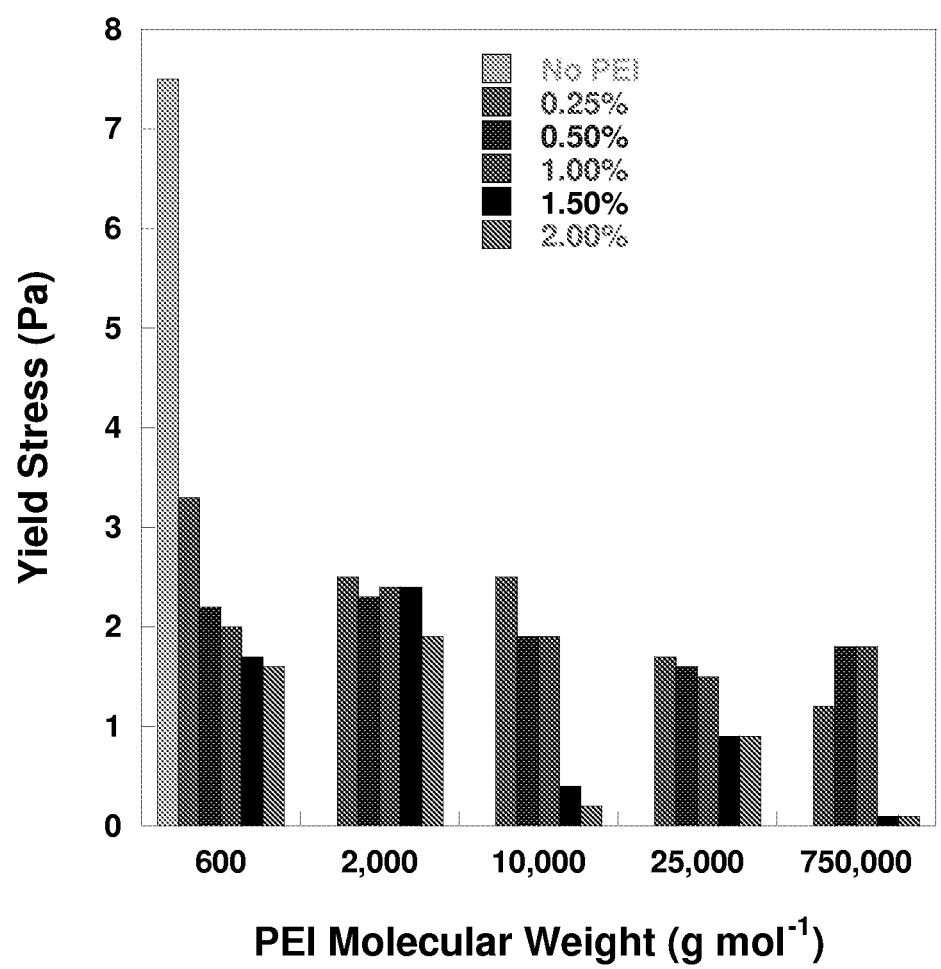
FIG. 16 is a plot of yield stress (Pa) of $LiFePO_4$—$H_2O$ suspensions with varying PEI MWs and concentrations.

FIG. 16 is a plot of yield stress (Pa) versus PEI molecular weight (g mol$^{-1}$) for LiFePO$_4$—H$_2$O suspensions with varying PEI MWs and concentrations. FIG. 16 shows the yield stress of LiFePO$_4$—H$_2$O suspensions at $\dot{\gamma}$<750 s$^{-1}$. The yield stress decreased with increasing PEI wt % except for PEI with MW>750,000 g mol$^{-1}$ and concentration of 0.50 wt % and 1.0 wt %. For a given PEI wt % and higher PEI MW (longer chain lengths), multiple LiFePO$_4$ particles could be covered with a single molecule. For lower PEI MW, it would take multiple molecules to cover the same amount of LiFePO$_4$ surface area.

Figure 17:
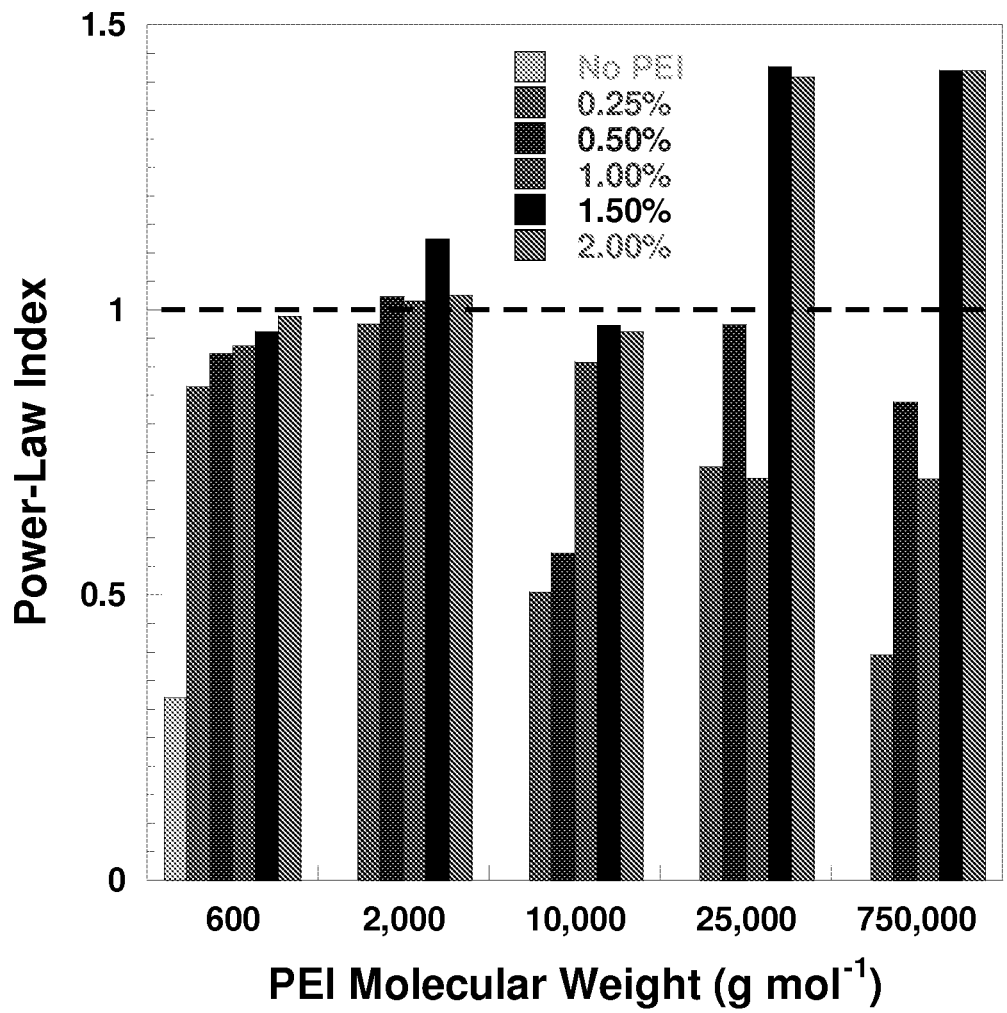
FIG. 17 is a plot of Power-Law Index of $LiFePO_4$—$H_2O$ suspensions with varying PEI MWs and concentrations.

FIG. 17 is a plot of power-law index versus PEI molecular weight (g mol$^{-1}$) for LiFePO$_4$—H$_2$O suspensions with varying PEI MWs and concentrations. Bingham plastic behavior was observed with PEI MW=600 and 2000 g mol$^{-1}$. All suspensions showed shear thinning or approached Bingham plastic behavior except for the ones with a PEI concentration ≥1.5 wt % and MW≥25,000 g mol$^{-1}$. The latter suspensions exhibited shear thickening behavior over the entire shear rate range. The power-law indices of other LiFePO$_4$—H$_2$O suspensions with PEI were higher and closer to one, indicating improved suspension stability. The power-law indices also increased (approaching 1) with increasing PEI MW from 600 to 2,000 g mol$^{-1}$ but decreased when further increasing PEI MW except for PEI concentration≥1.5 wt % and MW≥25,000 g mol$^{-1}$ where the suspensions demonstrated shear thickening behavior over the whole shear rate range. This indicates that the optimal PEI MW was 2000 g mol$^{-1}$ for LiFePO$_4$.

Figure 18:
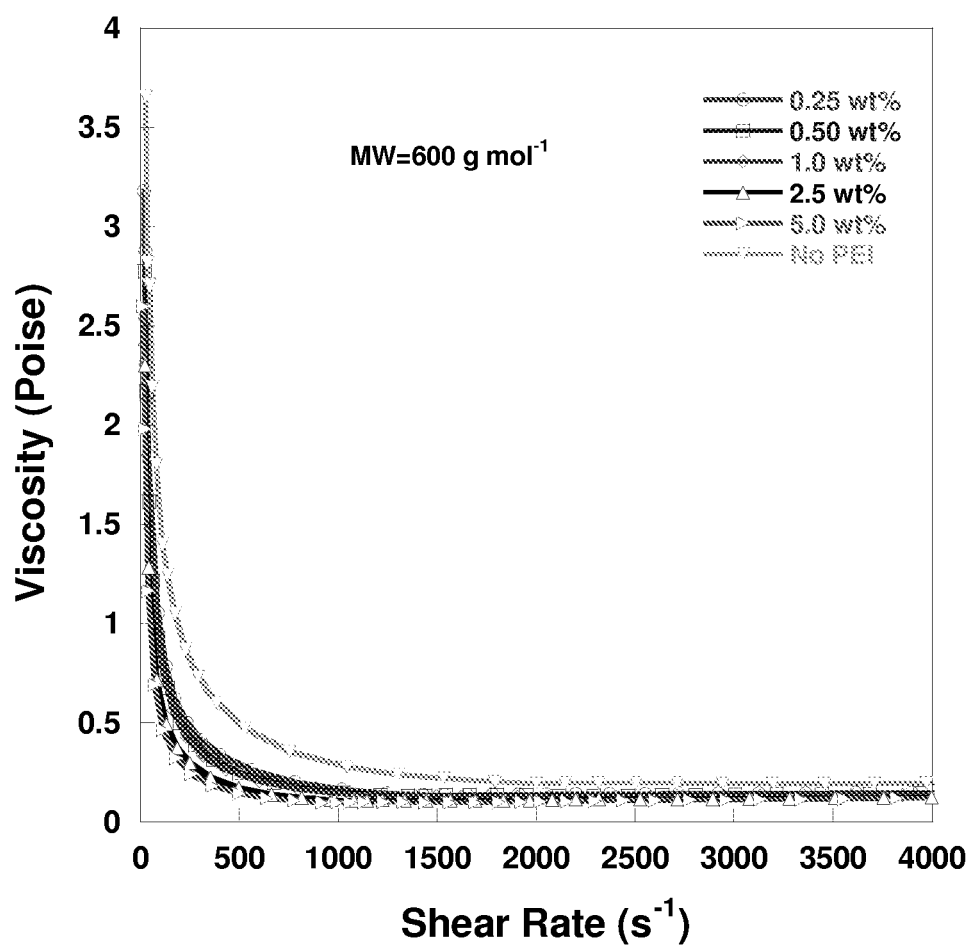
FIG. 18$a$)-$b$) is a plot of rheological properties of C45-$H_2O$ suspensions with varying PEI concentration (MW=600 g $mol^{-1}$) a) viscosity (Poise) versus shear rate ($s^{-1}$) and b) shear stress (Pa) versus shear rate ($s^{-1}$).
Figure 18:
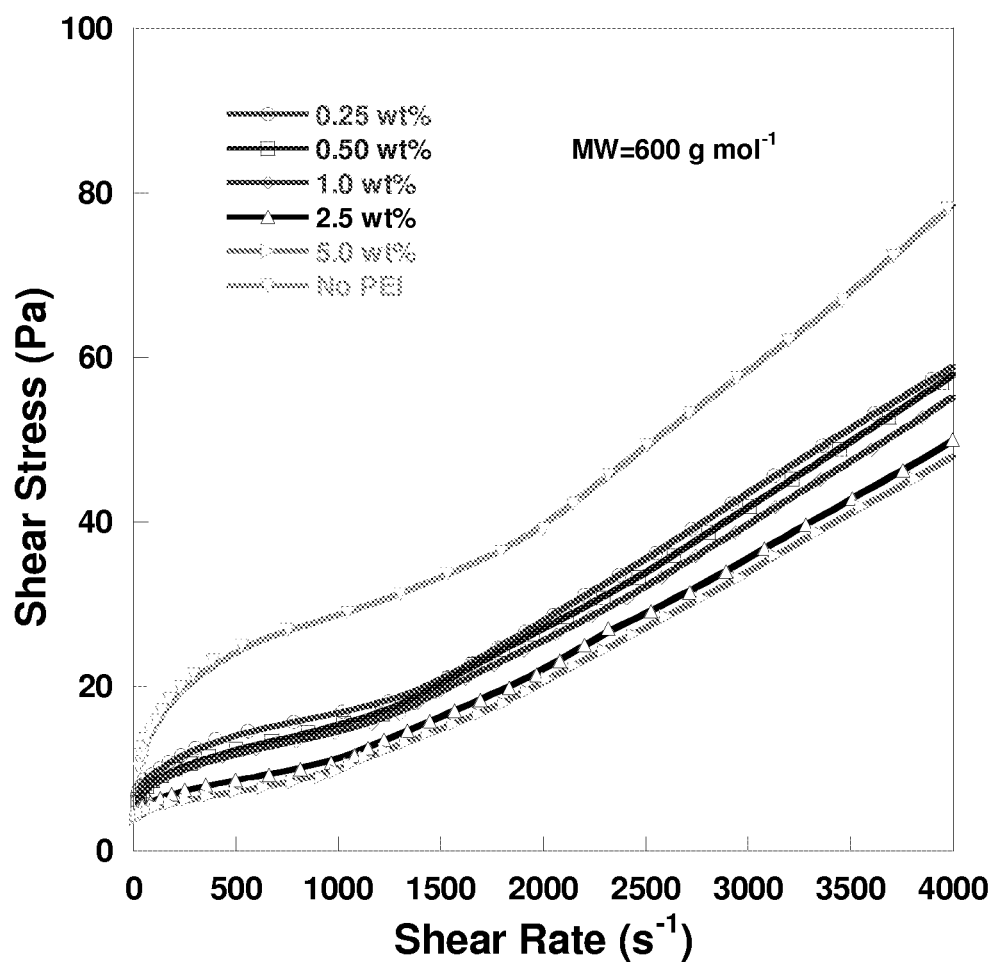
Figure 19:
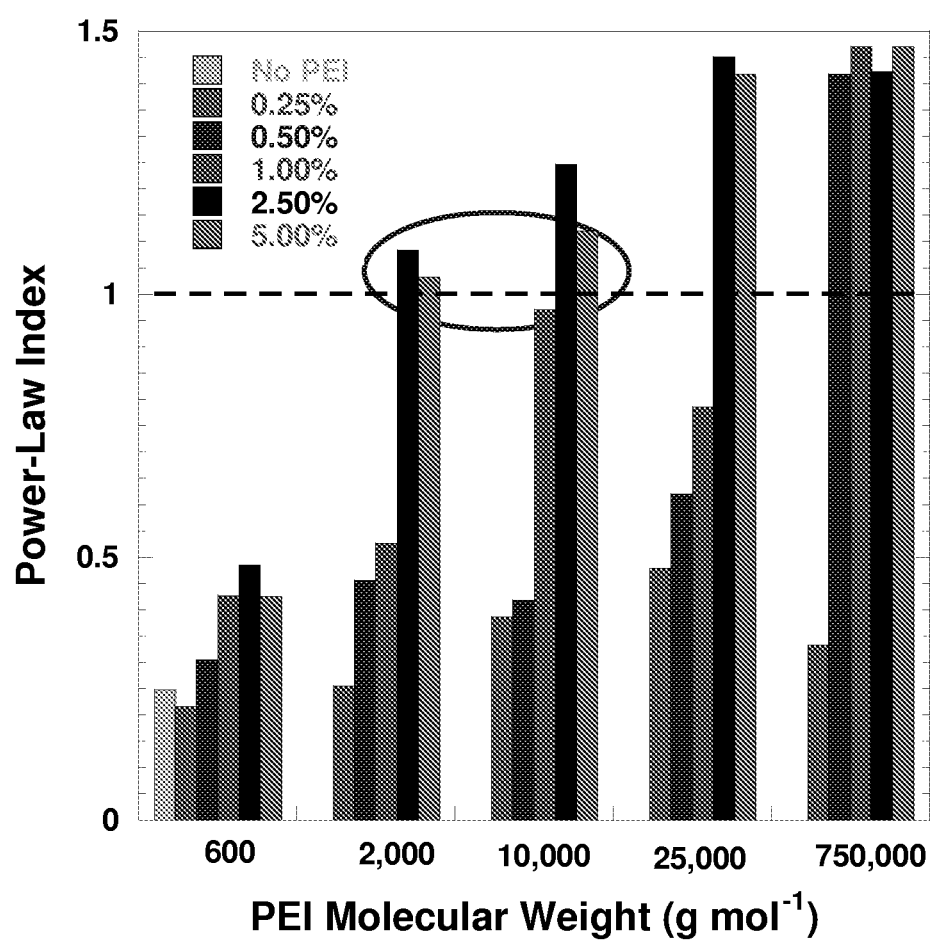
FIG. 19 is a plot of Power-Law Index of C45-$H_2O$ suspensions with varying PEI MWs and concentrations.

FIG. 18 is a similar plot of rheological properties as those shown in FIG. 15 of C45-H$_2$O suspensions with varying PEI concentration (MW=600 g mol$^{-1}$). FIG. 19 is a plot of power-law index versus PEI molecular weight (g mol$^{-1}$) for C45-H$_2$O suspensions with varying PEI concentrations. As shown in FIG. 18, the suspensions exhibited shear thinning behavior for low PEI concentration and MW, as opposed to Bingham plastic and shear thickening behavior for high PEI concentration and MW. This was evidenced by the power-law indices at shear rates below 750 s$^{-1}$ as shown in FIG. 19, which mostly increased with increasing PEI concentration and MW. Bingham plastic behavior was observed in the suspensions with 2.5 wt % to 5.0 wt % PEI with MW=2,000 g mol$^{-1}$ and with 1.0 wt % to 5.0 wt % PEI with MW=10,000 g mol$^{-1}$ (circled region in FIG. 19).

Figure 20:
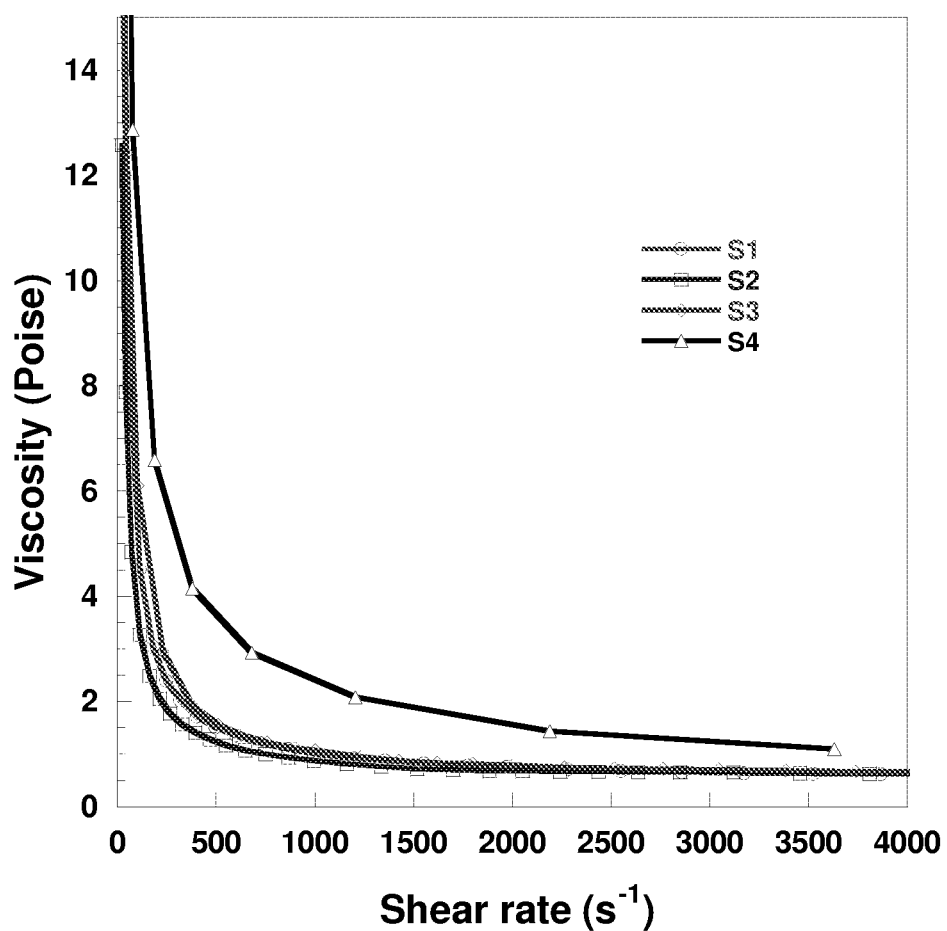
FIG. 20$a$)-$b$) are plots of rheological properties of $LiFePO_4$-C45-XG-$H_2O$ suspensions with 1.5 wt % PEI MW=2,000 g $mol^{-1}$ and 0.5 wt % PEI MW=10,000 g $mol^{-1}$ with different mixing sequences a) viscosity (Poise) versus shear rate ($s^{-1}$) and b) shear stress (Pa) versus shear rate ($s^{-1}$).
Figure 20:
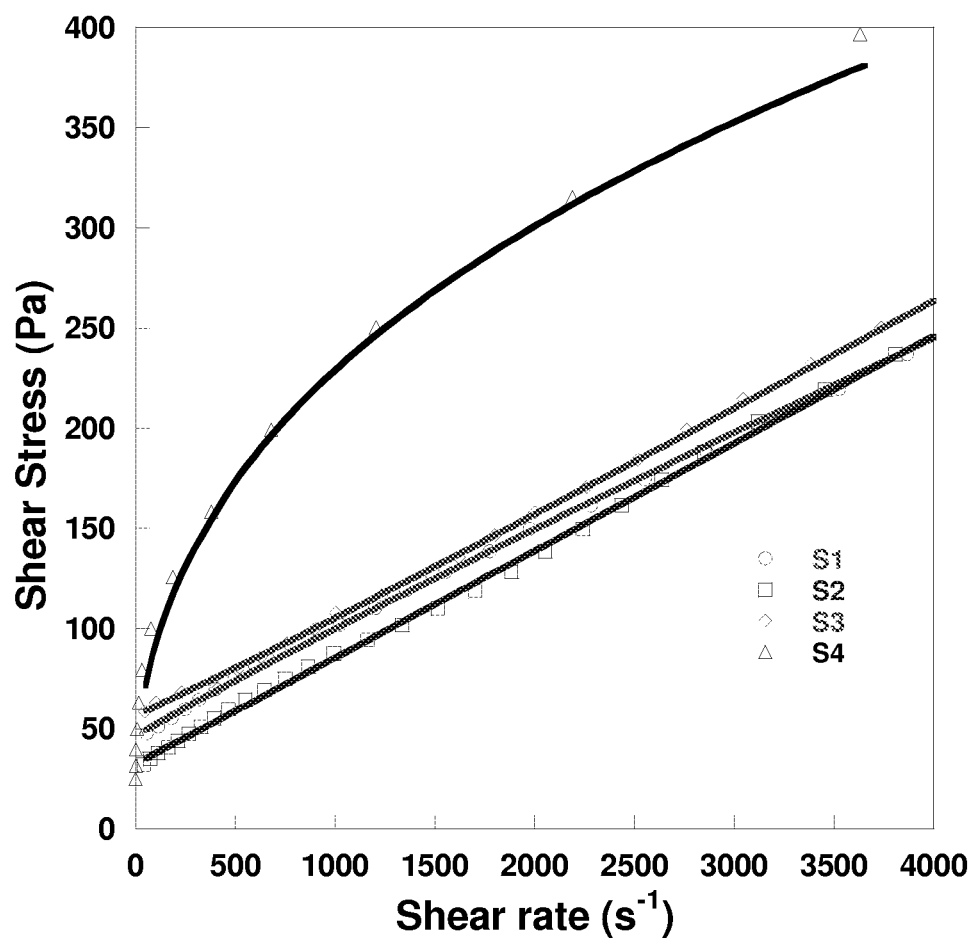

FIG. 20a)-b) are similar plots of rheological properties as those shown in FIGS. 15 and 18 of LiFePO$_4$-C45-XG-H$_2$O suspensions using four mixing sequences. The suspensions with S1, S2, and S3 demonstrated slightly shear thinning or approached Bingham plastic behavior as shown in Table 2.

TABLE 2

Parameters from the H-B model for the LiFePO$_4$—C45-XG-H$_2$O suspensions

|  | S1 | S2 | S3 | S4 |
|---|---|---|---|---|
| Power-law index | 0.94 | 1.01 | 1.05 | 0.39 |
| d$_{50}$ (μm) | 6.1 | 7.1 | 6.6 | 7.5 |

The suspension with S4 was more viscous and exhibited more pronounced shear thinning behavior, i.e. n-0.39, suggesting a less stable dispersion, and it also had the largest d50. Agglomerate size was reduced by dispersing LiFePO$_4$ and C45 in sequence, and it was further reduced by dispersing LiFePO$_4$ first and C45 second. Since the LiFePO$_4$/C45 ratio was 10/1, the optimum PEI wt % for C45 (5.0 wt % based on C45) is 0.5 wt % if based on LiFePO$_4$. Thus, the total PEI wt % in the LiFePO$_4$-C45-XG-H$_2$O suspensions was 2.0 wt % based on LiFePO$_4$. In previous studies, LiFePO$_4$-C45-XG-H$_2$O suspensions with 2.0 wt % PEI (MW=25,000 g mol$^{-1}$) mixed with S1 showed shear thinning behavior, n=0.87, and nearly 2×larger agglomerate size (d50=11.3 μm). Thus, dual dispersion of the solid phases (LiFePO$_4$ and C45) with different PEI molecules is a superior method for preparing and processing these multicomponent suspensions.

Figure 21:
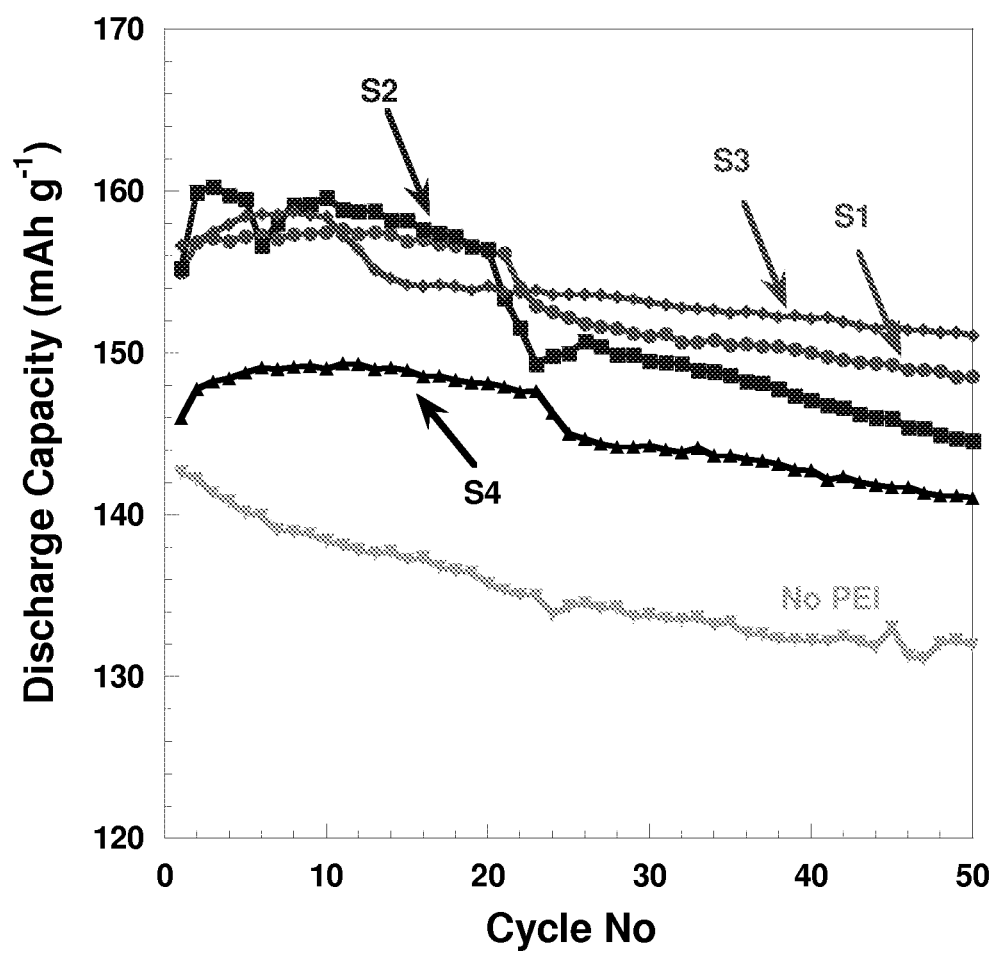
FIG. 21 is a plot of discharge capacity (mAh $g^{-1}$) versus cycles for $LiFePO_4$ cathode performance for $LiFePO_4$ cathodes with varying mixing sequences.

Discharge capacity of the LiFePO$_4$ cathodes using the four different mixing sequences (S1-S4) is shown in FIG. 21 for a half-cell configuration. All cathodes made with 1.5 wt % PEI (MW=2,000 g mol$^{-1}$) for the LiFePO$_4$ and 0.5 wt % PEI (MW=10,000 g mol$^{-1}$) for the C45 (based on the weight fraction of LiFePO$_4$) showed higher capacity compared to that without PEI (~10-20 mAh g$^{-1}$ higher after 50 cycles). The suspensions that underwent S1, S2, and S3 also exhibited higher capacity than for S4, verifying that dispersing LiFePO$_4$ and C45 separately was beneficial to cathode performance. In addition, the discharge capacities of the cathodes that underwent S1 and S3 were comparable to that for S2 for the first 20 cycles, but the capacity fade was less for S1 and S3 through 50 cycles. This observation indicates that LiFePO$_4$ should be dispersed before C45 for better capacity retention. Dispersing LiFePO$_4$ cathode suspensions with dual PEI molecules assists in controlling agglomeration better than when a single PEI molecule is used and was shown to benefit cathode performance.

Example

As received LiFePO$_4$ (2-3 wt % C, P2, Phostech Lithium Inc.), Super P C45 (Timcal) (C45 hereafter), xanthan gum (Nuts Online) and poly(ethyleneimine) (PEI) (MW=25,000 gmol$^{-1}$, Sigma-Aldrich) were used, Aqueous LiFePO$_4$ dispersions with LiFePO$_4$/C45/xanthan gum/PEI=100/10/3.5/1 wt. fraction were prepared by dissolving xanthan gum in PEI solution for 10 min followed by mixing LiFePO$_4$ powder into the above solution by high shear mixer (Model 50, Netzsch) for 10 min. The C45 powder was added to the dispersion and mixed for another 10 min.

The surface energies of LiFePO$_4$, C45, and xanthan gum powders were calculated using the Washburn absorption method with Krüss FL12 powder cells (0.5 grams per individual test). The Al foil was treated by corona plasma discharge (Compak 2000, Enrocon) at energy densities of 0.14 J cm$^{-2}$, 0.4 J cm$^{-2}$, 1.7 J cm$^{-2}$, and 6.7 J cm$^{-2}$ for surface energy improvement. The surface energy of treated and untreated Al foil (MTI Corp.) and surface tension of the aqueous LiFePO$_4$ dispersion were calculated from the contact angles with diidomethane and water using the Fowkes theory. The contact angles were measured by a goniometor (Model 260, Ramé-hart Instrument Co.) with each result averaged from 6 measurements.

The LiFePO$_4$ aqueous dispersions were coated by a custom slot-die coater (Frontier Industrial Technology) on untreated and treated Al foil, and pre-dried in a heating zone consisting of two IR lamps and seven convection ovens. The pre-dried cathode was further dried in a vacuum oven at 90° C. for 2 h before being assembled into half cells. Half cells were assembled with LiFePO$_4$ and Li metal as the cathodes and anodes, respectively, and Celgard 2325 was used as the separator. The cathodes had a solid loading of 4.0 mg cm$^{-2}$, and the electrolyte was 1.2 M LiPF$_6$ in ethylene carbonate: diethyl carbonate (3/7 wt. ratio, Novolyte Technologies). The cells were cycled at 0.5 C/−0.5 C charge/discharge rates (0.34 mA cm$^{-2}$) for 100 cycles and also from 0.20 to 20 C to evaluate capacity fade and rate capability, respectively, between 2.5 and 4.2 V using a potentialstat (VSP, BioLogic) at 25° C.

Figure 22:
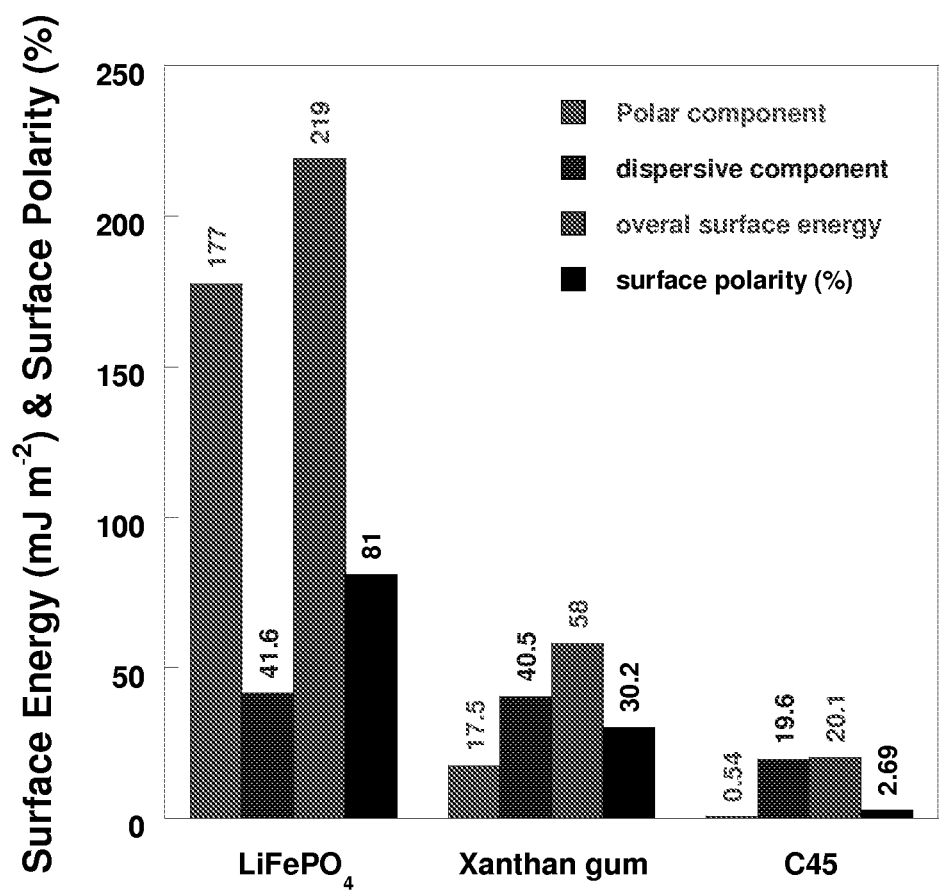
FIG. 22 is a chart of surface energy (mJ $m^{-2}$) and surface polarity (%) for $LiFePO_4$, Xanthan gum, and C45.

FIG. 22 is a chart of surface energy (mJ/m$^{-2}$) and surface polarity (%) for LiFePO$_4$, Xanthan gum, and C45. LiFePO$_4$ exhibited an extremely high surface energy with high polarity, whereas C45 showed a low surface energy and low polarity. The surface energies of LiFePO$_4$, C45, and xanthan gum were calculated using the average contact angles together with the Fowkes equation. LiFePO$_4$ exhibited a surface energy (219.0 mJ m$^{-2}$) and surface polarity (81.0%), which is defined as:

$$\text{surface polarity} = (\text{polar component})/(\text{overall surface energy}) \times 100\% \quad (2)$$

Surface polarity gives the ratio of wetting energy comprising driving forces such as hydrogen bonding, strong dipole moments, or acid-base interactions to the total surface energy, as compared to dispersive driving forces comprising van der Waals interactions and weak dipole moments. In contrast to the LiFePO$_4$, C45 demonstrated extremely low surface energy (20.1 mJ/m$^2$) with 2.7% surface polarity. Xanthan gum showed a surface energy (58.0 mJ m$^{-2}$) and surface polarity (30.2%) in between that of LiFePO$_4$ and C45.

Figure 23:
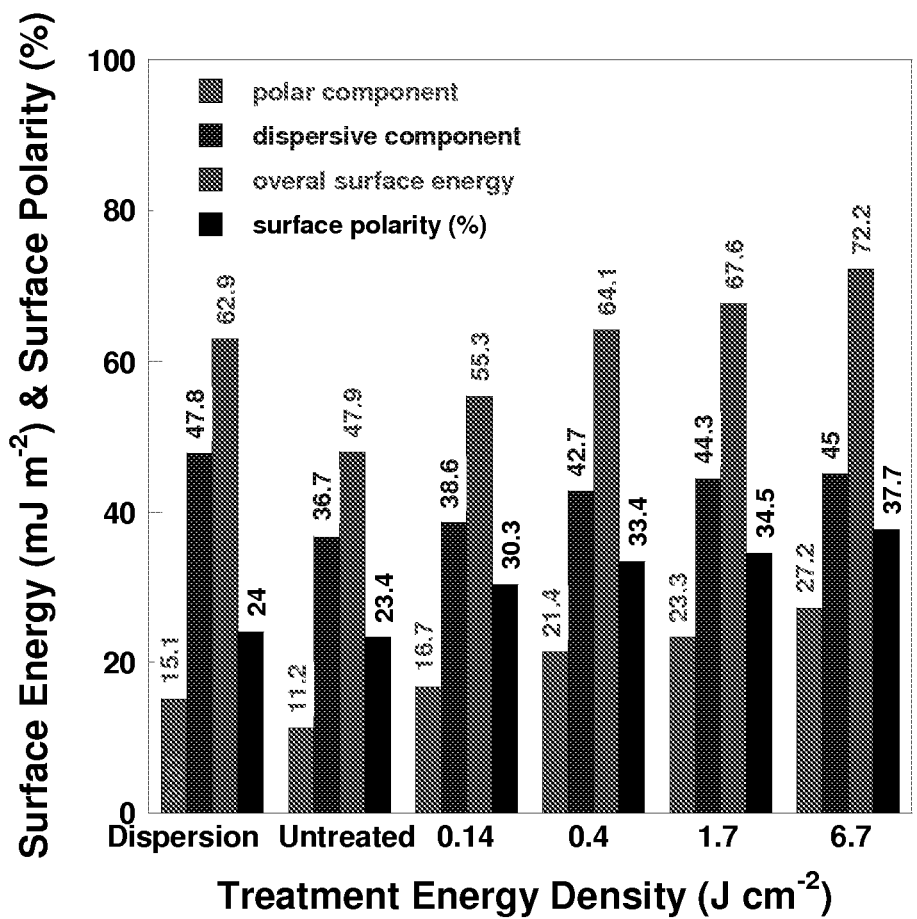
FIG. 23 is a chart of surface energy (mJ m$^{-2}$) and surface polarity (%) versus treatment energy density (J/cm$^{-2}$) of treated and untreated Al foil and LiFePO$_4$ aqueous dispersion.

FIG. 23 is a chart of surface energy (mJ m$^{-2}$) and surface polarity (%) versus corona treatment energy density (J cm$^{-2}$) of Al foil compared to the LiFePO$_4$ aqueous dispersion. The surface energy and polarity of Al foil increased with increasing corona treatment energy density, and good wetting was expected with corona treatment energy density of 0.4 J cm$^{-2}$ and above. The LiFePO$_4$ aqueous dispersion demonstrated an overall surface tension of 62.9 mN m$^{-1}$ and surface polarity of 24.0%. This value is much lower than the surface energy of LiFePO$_4$ powder, which indicates the contribution of LiFePO$_4$ to the composite surface tension of the aqueous dispersions is minimal. Consequently, the composite surface tension of the dispersions is governed by the water solvent and binder and will not change significantly when replacing LiFePO$_4$ with other active materials; thus, there should be no appreciable difference in the dispersion wetting properties during electrode coating process when different active materials are used.

More importantly, the overall surface tension of 62.9 mN m$^{-1}$ for the LiFePO$_4$ aqueous dispersion is much higher than the surface energy of the untreated Al foil (47.9 mJ m$^{-2}$), and this difference will cause inferior wetting when the dispersion is coated on the untreated Al foil. Calculated contact angles determined by the Fowkes equation were used for this work, and the surface energy results are shown in FIG. 23. The high calculated contact angle of 41.8° for the LiFePO$_4$ aqueous dispersion on Al foil further suggests inferior wetting. These collective findings confirm that the surface energy of the Al foil needs to be increased for optimum wetting of the aqueous cathode dispersion, which was accomplished by corona plasma treatment with different discharge energy densities of 0.14 J cm$^{-2}$, 0.4 J cm$^{-2}$, 1.7 J cm$^{-2}$, and 6.7 J cm$^{-2}$.

Surface energy of the Al foil increased with increasing corona treatment energy density. This increase in surface energy of the Al foil is partially due to the removal of adsorbed hydrocarbons since such species are known to substantially reduce the surface energy of solids. In addition, a thin layer of Al$_2$O$_3$ likely forms on the surface of the Al foil due to the exposure to ozone during the corona treatment process, which would further increase the surface energy. Corona treatment in the presence of air has been found to alter the surface composition of polymer films due to air oxidation. Thus, the corona treatment could have oxidized more Al into Al$_2$O$_3$ with increasing energy density, which would have increased the Al foil surface energy since the surface energy of Al$_2$O$_3$ is higher than that of Al.

In addition, surface polarity of the Al foil also increased with increasing corona treatment energy density. Higher surface polarity likely indicates the Al foil surface is more attractive to these aqueous coatings since water is a highly polar molecule. The surface polarity increased from 11.2 mJ m$^{-2}$ (23.4%) for the untreated Al foil to 27.2 mJ m$^{-2}$ (37.7%) for the Al foil treated at 6.7 J cm$^{-2}$, indicating better wetting of the aqueous dispersions. However, the chemical interaction between the water solvent and the Al foil surface is not the only factor that governs coating integrity and adhesion.

Adhesion energy and interfacial tension calculations.

Two additional parameters for evaluating coating quality are physicochemical adhesion energy and interfacial tension. The adhesion energy, $\phi_{SL}$, characterizes initial adhesion of the coating and can be represented by the following equation:

$$\phi_{SL} = 2(\sigma^D_L)^{1/2}(\sigma^D_S)^{1/2} + 2(\sigma^P_L)^{1/2}(\sigma^P_S)^{1/2} \quad (3)$$

Interfacial tension, $\gamma_{SL}$, characterizes long term adhesion and can be defined as, $$\gamma_{SL} = \sigma_S + \sigma_L - \phi_{SL} \quad (4)$$

where $\sigma$ is overall surface energy; L and S are subscripts representing the liquid and solid phases, respectively; D and P are superscripts representing the dispersive and polar components of surface energy, respectively.

Figure 24:
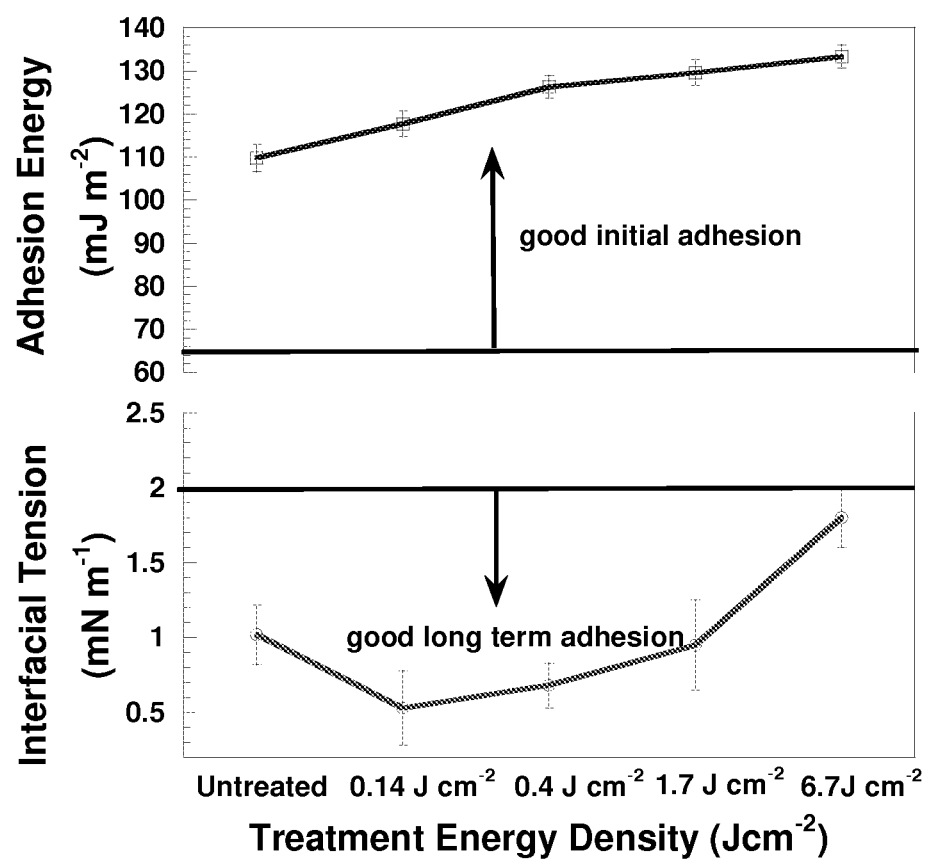
FIG. 24 is a chart of interfacial tension (mNm$^{-1}$) and adhesion energy (mJ m$^{-2}$) versus treatment energy density (J cm$^{-2}$) between LiFePO$_4$ aqueous dispersion and Al foil.

FIG. 24 is a chart of interfacial tension (mN/m) and adhesion energy (mJ m$^{-2}$) between the LiFePO$_4$ aqueous dispersion and Al foil versus treatment energy density (J cm$^{-2}$). The adhesion energy and interfacial tension are calculated from the surface energy values in FIG. 23 and are shown in FIG. 24. Higher adhesion energy means better initial adhesion, and an industry standard is that it should be greater than 65 mJ m$^{-2}$. All adhesion energy values for coatings on untreated and treated Al foil were greater than 65 mJ m$^{-2}$ indicating good initial adhesion. However, the adhesion energies of the coatings on treated Al foil were higher than that on untreated foil and increased with increasing corona treatment energy density, which shows better initial adhesion with corona treatment. In contrast, a low interfacial tension is desired for good long term adhesion, and the industry standard is preferably less than 2 mN m$^{-1}$. All coatings exhibited good long term adhesion with the interfacial tension lower than 2 mN m$^{-1}$. However, the interfacial tension increased with increasing treatment energy density and, with the Al foil treated at 6.7 J cm$^{-2}$, was even higher than that with untreated Al foil. Higher corona treatment energy density could damage the Al foil surface (or Al$_2$O$_3$ monolayer), e.g. forming defects, voids, etc., which could be detrimental to the long term adhesion. Thus, the corona treatment energy density is preferred to be much lower than 6.7 J cm$^{-2}$.

Electrode Performance Comparison.

Figure 25:
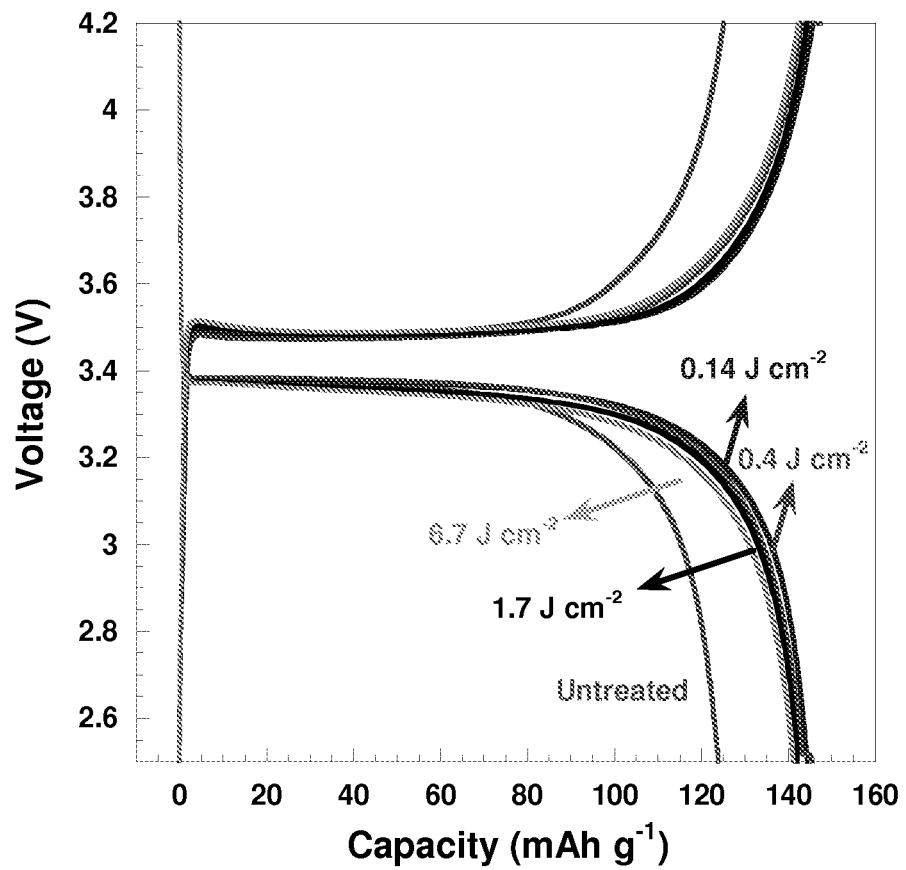
FIG. 25 is a plot of voltage profile (V) versus capacity (mAh g$^{-1}$) at 0.5 C/−0.5 C for LiFePO$_4$ cathodes on Al foil.

FIG. 25 shows the first charge and discharge curves of the LiFePO$_4$ half-cells for treated and untreated Al foil at 0.5 C/-0.5 C (0.34 mA cm$^{-2}$). The LiFePO$_4$ cathodes with corona treated Al foil exhibited higher initial discharge capacity, and all electrodes demonstrated a small irreversible capacity (c.a. 2 mAh g$^{-1}$).

Figure 26:
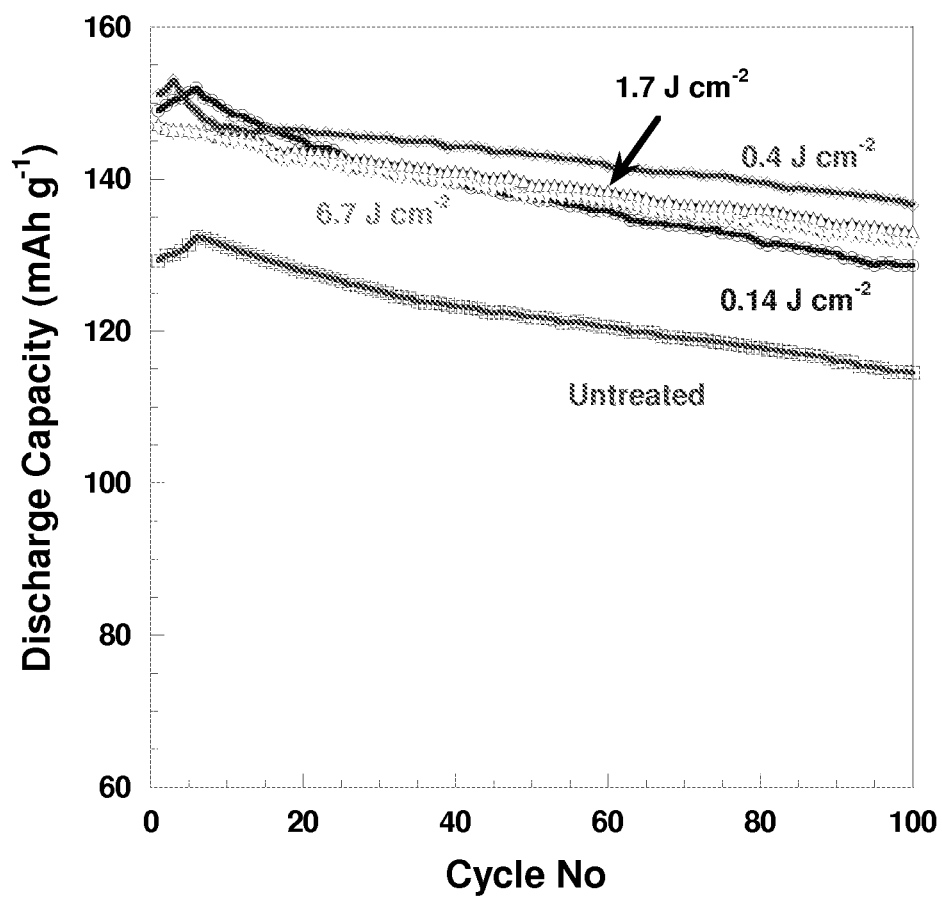
FIG. 26 is a plot of discharge capacity (mAh g$^{-1}$) versus cycles for LiFePO$_4$ cathodes at 0.5 C/−0.5 C.

Cycling performance of the LiFePO$_4$ cathodes with treated and untreated Al foil at 0.5 C/-0.5 C (0.34 mA cm$^{-2}$) and 25° C. is given in FIG. 26. The LiFePO$_4$ cathodes with treated Al foil demonstrated excellent initial discharge capacity (~150 mAh g$^{-1}$), which was ~20 mAh/g higher than without corona treatment. The lower capacity with untreated Al foil was attributed to the inferior contact between LiFePO$_4$ and current collector. The discharge capacity magnitude after 100 cycles went in the order of 0.4 J cm$^{-2}$>1.7 J cm$^{-2}$>6.7 J cm$^{-2}$>0.14 J cm$^{-2}$>untreated with an observed threshold in the corona treatment energy density between 0.14 J cm$^{-2}$ and 1.7 J cm$^{-2}$. This threshold must be reached before the critical surface cleaning effects occur. Therefore, treatment at 0.14 J cm$^{-2}$ is too low to remove all the adsorbed species on the Al foil surface and the treatment effect is limited. Too high of a treatment energy density adversely alters the surface chemical composition and microstructure. It likely degrades the surface by forming a thick Al$_2$O$_3$ interfacial layer and/or voids and defects. Furthermore, the capacity retention was also superior at 91% for corona treatment at 0.4 J cm$^{-2}$ as compared to 86% for untreated foil.

Figure 27:
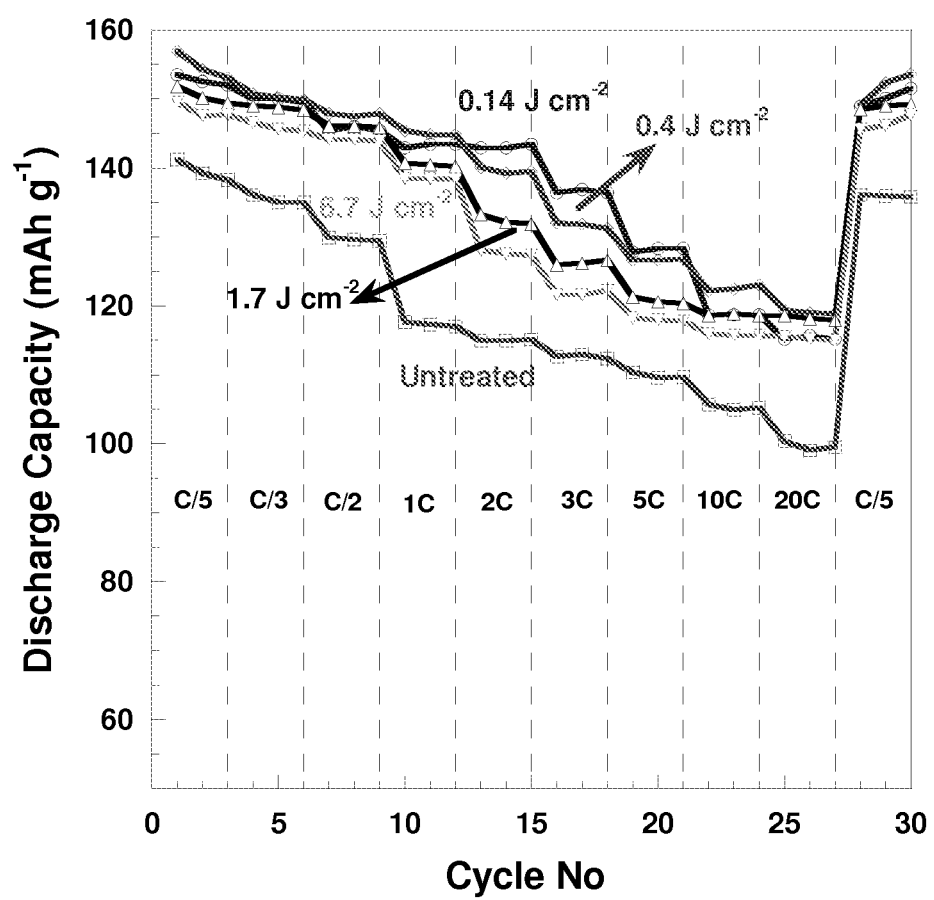
FIG. 27 is a plot of discharge capacity (mAh g$^{-1}$) cycles for LiFePO$_4$ cathodes at various C rates.

The cells were also cycled from 0.2 C (0.136 mA cm$^{-2}$) to 20 C (13.6 mA cm$^{-2}$) with three cycles each for determining rate performance, and the results are shown in FIG. 27. The LiFePO$_4$ cathodes with treated Al foil also demonstrated much better rate performance than those without corona treatment across the entire range of C-rates, especially below 3 C. At higher C-rates, the improvement was less significant because performance is governed by lithium ion transport in the electrode in this operating regime, i.e. electronic conductivity between the LiFePO$_4$ cathode and Al current collector has little effect at high current density. Capacities for all corona treated Al foils were comparable at C/5 and C/3. The LiFePO$_4$ cathodes with Al foil treated at 0.14 J cm$^{-2}$ and 0.4 J cm$^{-2}$ exhibited the best performance (~155 mAh$^{-1}$g at C/5 and ~120 mAh g$^{-1}$ at 20 C). The final capacity at C/5 almost completely recovered to the value at the beginning of the rate performance test indicating excellent cyclability.

The properties of the liquids used in the Washburn measurement are given in Table 3:

TABLE 3

| Liquid | Overall Surface Tension (mN m$^{-1}$) | Polar Component (mN m$^{-1}$) | Dispersive Component (mN m$^{-1}$) | Density (g cm$^{-3}$) | Viscosity (cp) |
|---|---|---|---|---|---|
| Hexane | 18.4 | 0.0 | 18.4 | 0.661 | 0.33 |
| Diiodomethane | 50.8 | 0.0 | 50.8 | 3.325 | 2.76 |
| Ethylene Glycol | 47.7 | 21.3 | 26.4 | 1.109 | 16.1 |
| Water | 72.8 | 46.4 | 26.4 | 0.998 | 1.02 |
| Mercury | 434.8 | 356.3 | 78.5 | 13.53 | 1.55 |

This invention can be embodied in other forms with departing from the spirit or essential attributes thereof, and accordingly reference should be had to the following claims to determine the scope of the invention.

We claim:

1. A method of making a battery electrode, comprising the steps of:
   dispersing an active electrode material in water to create an active electrode dispersion;
   dispersing a conductive additive material in water to create a conductive additive dispersion, wherein the active electrode dispersion and the conductive additive dispersion are separate dispersions;
   measuring the zeta potential of the active electrode material prior to the dispersing step, and selecting a cationic or anionic dispersant based on the zeta potential and mixing the dispersant with the active electrode material and the water;
   measuring the zeta potential of the conductive additive material prior to the dispersing step, and selecting a cationic or anionic dispersant based on the zeta potential and mixing the dispersant with the conductive additive material and the water;
   depositing a coating of the active electrode dispersion and conductive additive dispersion with the dispersants on a current collector;
   heating the coating to remove water from the coating and forming an electrode; and,
   further comprising the step of determining the isoelectric point (IEP) of the active electrode material and the conductive additive material prior to the dispersing step, and wherein if the isoelectric point (IEP) pH<6 and the operating pH>6 selecting a cationic dispersant, if IEP 6≤ph≤8, then selecting a cationic or anionic surfactant, and if IEP pH >8 and the operating pH<8 then selecting an anionic surfactant.

2. The method of claim 1, further comprising the step of treating a surface of a current collector to raise the surface energy of the surface to at least the surface tension of the mixed dispersion.

3. The method of claim 1, wherein the step of measuring the zeta potential includes the step of determining if the zeta potential is greater than +30 mV or less than −30 mV, and adding the dispersant in an amount such that the zeta potential of the active electrode material and the conductive additive material becomes greater than +30 mV or less than −30 mV.

4. The method of claim 1, wherein the active electrode material is a cathode material.

5. The method of claim 4, wherein the cathode material is at least one selected from the group consisting of LiCoO$_2$, LiNiO$_2$, LiMn$_2$O$_4$, LiFePO$_4$, LiMnPO$_4$, LiFe$_x$Mn$_{1-x}$PO$_4$, LiNi$_x$Mn$_y$Co$_{1-x-y}$O$_2$, Li$_{1+x}$Ni$_y$Mn$_z$Co$_{1-x-y-z}$O$_2$, LiNi$_x$Mn$_y$Co$_z$Al$_{1-x-y-z}$O$_2$, Li$_{1+x}$Ni$_y$Mn$_{1-x}$Co$_z$O$_2$, and Cu$_2$ZnSn(S$_{1-x}$Se$_x$)$_4$.

6. The method of claim 1, wherein the active electrode material is an anode material.

7. The method of claim 6, wherein the anode material is at least one selected from the group consisting of synthetic graphite particulate, natural graphite particulate, Si particle-C fiber nanocomposites, LiTiO$_2$, Li$_4$Ti$_5$O$_{12}$, Sn particulate, and Si particulate.

8. The method of claim 1, wherein the conductive additive is at least one selected from the group consisting of carbon black, graphite particulate, graphene, and carbon nanotubes.

9. The method of claim 1, further comprising the step of dispersing at least one binder material with the at least one dispersant in at least one selected from the group consisting of the active electrode dispersion and the conductive additive dispersion.

10. The method of claim 1, further comprising the step of dispersing at least one water soluble binder in the water, the binder being at least one selected from the group consisting of styrene butadiene rubber (SBR), carboxymethyl cellulose (CMC), xanthan gum, perfluorosulfonic acid (PFSA), polyacrylic acid (PAA), and polyvinylidene fluoride (PVDF).

11. The method of claim 1, wherein the electrode further comprises a binder and the electrode comprises 60-99% active electrode material, 0-20 wt % conductive additive, and 1-20 wt % binder, based on the total weight of the electrode.

12. The method of claim 1, wherein the heating step comprises a multistage heating with different temperatures.

13. The method of claim 1, wherein a dispersant is provided for dispersing the active electrode material and at least one other dispersant is provided for dispersing the conductive additive.

14. The method of claim 1, wherein the cationic dispersant is polyethyleneimine (PEI), and the anionic dispersant is polyacrylic acid (PAA).

15. The method of claim 1, wherein the aqueous dispersion is essentially free of organic solvent in at least one selected from the group consisting of the active electrode dispersion and the conductive additive dispersion.

16. The method of claim 1, wherein the heating of the coated suspension is between 90° F. and 210° F.

17. The method of claim 1, wherein the heating is stepped and conducted at different temperatures during a multistage heating cycle.

18. The method of claim 17, wherein the heating process comprises nine steps starting at 90° F. at the 1st step, reaching at 210° F. at the 8th step and ending at 170° F. at the 9th step, ±5 degrees for each step.

19. The method of claim 17, further comprising a second heating step, the second heating step comprising subjecting the electrode to temperatures of between 90° F. and 400° F.

20. The method of claim 1, wherein said heating step is performed under vacuum.

21. The method of claim 1, wherein the active electrode material comprises $LiFePO_4$, the conductive additive comprises carbon black, and the dispersant comprises polyethyleneimine (PEI).

22. The method of claim 21, wherein the concentration of PEI is 0.05 wt % to 10.0 wt %.

23. The method of claim 2, wherein the surface treatment step comprises subjecting the surface of the current collector to at least one selected from the group consisting of a plasma treatment, laser treatment, wet chemical treatment, ion beam treatment, electron beam treatment, and thermal etching treatment.

24. The method of claim 23, wherein the plasma treatment is a corona treatment.

25. The method of claim 1, wherein dispersant is added to the active electrode dispersion and conductive additive dispersion until the solution acquires a predetermined rheological flow characteristic, and wherein the predetermined rheological flow characteristic is the slope of a log-log plot of the shear stress as a function of shear rate.

26. The method of claim 25, wherein if the slope is not between 0.9 and 1.1 further comprising the step of changing at least one of the dispersant or the concentration of the dispersant in the dispersion.

* * * * *